US00RE37570E

(19) United States
(12) Reissued Patent
Springer et al.

(10) Patent Number: US RE37,570 E
(45) Date of Reissued Patent: Mar. 5, 2002

(54) WHEEL-ACTIVATED VEHICLE RESTRAINT SYSTEM

(75) Inventors: Scott L. Springer, Whitewater; Norbert Hahn, Franklin, both of WI (US); Hans Van De Wiel, Drunen (NL); Marcel Boon, Eindhoven (NL); Frank De Beer, Hilvarenbeek (NL)

(73) Assignee: Rite-Hite Holding Corporation, Milwaukee, WI (US)

(21) Appl. No.: 09/215,565

(22) Filed: Dec. 10, 1998

Related U.S. Patent Documents

Reissue of:
(64) Patent No.: 5,762,459
Issued: Jun. 9, 1998
Appl. No.: 08/946,795
Filed: Oct. 8, 1997

U.S. Applications:

(63) Continuation of application No. 08/562,912, filed on Nov. 27, 1995, now abandoned, which is a continuation-in-part of application No. 08/327,308, filed on Oct. 21, 1994, now abandoned.

(51) Int. Cl.[7] ..... B65G 69/00
(52) U.S. Cl. ..... 414/401; 188/32
(58) Field of Search ..... 414/396, 401, 414/402, 584; 410/30, 49; 188/32

(56) References Cited

U.S. PATENT DOCUMENTS

| | | | |
|---|---|---|---|
| 1,102,773 | A | 7/1914 | Martin |
| 2,413,744 | A | 1/1947 | Carter |
| 2,773,564 | A | 12/1956 | Garard, Sr. |

(List continued on next page.)

FOREIGN PATENT DOCUMENTS

| | | | |
|---|---|---|---|
| CA | 1308222 | | 10/1992 |
| DE | 583404 | | 9/1933 |
| DE | 27 35 826 | | 2/1979 |
| DE | 3830891 | A1 | 3/1990 |
| DE | 4242415 | C1 | 2/1994 |
| EP | 0302356 | A1 | 2/1989 |
| EP | 0384850 | A1 | 8/1990 |
| EP | 0537075 | B1 | 4/1993 |

(List continued on next page.)

OTHER PUBLICATIONS

Blueprint—Pentalift—2 pages reduced.
Brochure—Kelley Auto Chock Truck Restraint—2 pages.
Combar product 5 photos.
Brochure re Combar product (German)—4 pages.
Dyna Seal brochure of Wheelblocker and translation—4 pages.
*Barrometer*, Nov. 1994—4 pages from German publication.
"Stertil" Combilok—Vrachtwagenblokkering—5 pages of German Information Bulletin.

*Primary Examiner*—James W. Keenan

(57) ABSTRACT

A wheel-activated vehicle restraint system including a support structure disposed beside the path of the vehicle approaching the dock, and including a guide member extending away from the dock face, and an elevated supporting member. A trigger assembly is operatively connected to the guide member, and initially engages the wheel of the vehicle as it rolls toward the dock. A locking arm operatively engages the supporting member to move from a stored position to a chocking position on the wheel as the wheel engages the trigger and moves it toward the dock. A trolley assembly operatively connects the trigger assembly and the locking arm, the trolley assembly and the locking arm being connected at a connection point. The trigger assembly is selectively positionable relative to the connection point in response to the dimensions of the wheel, and the locking arm engages a bottom portion of the wheel, and moves along the peripheral surface of the wheel to a chocking position as the wheel continues to push the trigger assembly toward the dock.

66 Claims, 15 Drawing Sheets

U.S. PATENT DOCUMENTS

| | | | |
|---|---|---|---|
| 3,110,466 | A | 11/1963 | O'Sullivan |
| 3,221,907 | A | 12/1965 | O'Sullivan |
| 3,305,049 | A | 2/1967 | Willey |
| 3,447,639 | A | 6/1969 | Parr |
| 3,542,157 | A | 11/1970 | Noah |
| 3,666,118 | A | 5/1972 | Raynes et al. |
| 3,667,160 | A | 6/1972 | Salloum |
| 4,013,145 | A | 3/1977 | Mumm |
| 4,024,820 | A | 5/1977 | Hlinsky et al. |
| 4,122,629 | A | 10/1978 | Rennick |
| 4,146,888 | A | 3/1979 | Grunewald et al. |
| 4,191,503 | A | 3/1980 | Neff et al. |
| 4,207,019 | A | 6/1980 | Cone |
| 4,208,161 | A | 6/1980 | Hipp et al. |
| 4,216,724 | A | 8/1980 | Grillet |
| 4,264,259 | A | 4/1981 | Hipp |
| 4,267,748 | A | 5/1981 | Grunewald et al. |
| 4,282,621 | A | 8/1981 | Anthony et al. |
| 4,373,847 | A | 2/1983 | Hipp et al. |
| 4,379,354 | A | 4/1983 | Hahn et al. |
| 4,443,150 | A | 4/1984 | Hahn et al. |
| 4,472,099 | A | 9/1984 | Hahn et al. |
| 4,560,315 | A | 12/1985 | Hahn et al. |
| 4,572,080 | A | 2/1986 | Williams et al. |
| 4,605,353 | A | 8/1986 | Hahn et al. |
| 4,634,334 | A | 1/1987 | Hahn et al. |
| 4,653,967 | A | 3/1987 | Isaksson et al. |
| 4,674,941 | A | 6/1987 | Hageman |
| 4,676,344 | A | 6/1987 | Locicero |
| 4,695,216 | A | 9/1987 | Erlandsson |
| 4,728,242 | A | 3/1988 | Erlandsson |
| 4,759,678 | A | 7/1988 | Hageman |
| 4,765,792 | A | 8/1988 | Cherry et al. |
| 4,767,254 | A | 8/1988 | Kovach et al. |
| 4,784,567 | A | 11/1988 | Hageman et al. |
| 4,815,918 | A | 3/1989 | Bennett et al. |
| RE32,968 | E | 6/1989 | Hahn |
| 4,861,217 | A | 8/1989 | Erlandsson |
| 4,865,508 | A | 9/1989 | Carlson |
| RE33,154 | E | 1/1990 | Hahn et al. |
| 4,915,568 | A | 4/1990 | West |
| RE33,242 | E | 6/1990 | Hipp et al. |
| 4,938,647 | A | 7/1990 | Erlandsson |
| 4,963,068 | A | 10/1990 | Gelder |
| 4,969,792 | A | 11/1990 | Ellis et al. |
| 4,973,213 | A | 11/1990 | Erlandsson |
| 5,096,021 | A | 3/1992 | Tart |
| 5,249,905 | A | 10/1993 | Warner et al. |
| 5,302,063 | A | 4/1994 | Winsor |
| 5,375,965 | A | 12/1994 | Springer et al. |
| 5,553,987 | A | 9/1996 | Ellis |
| 5,709,518 | A | 1/1998 | Alexander et al. |

FOREIGN PATENT DOCUMENTS

| | | |
|---|---|---|
| EP | 0580415 A1 | 1/1994 |
| EP | 0639488 | 2/1995 |
| FR | 2284481 | 4/1976 |
| FR | 2394423 | 2/1979 |
| FR | 2652340 | 3/1991 |
| FR | 2672578 | 8/1992 |
| FR | 2682343 | 4/1993 |
| FR | 2689845 | 10/1993 |
| IT | 526008 | 2/1958 |
| JP | 60-36230 | 2/1985 |
| NL | 0157253 | 7/1978 |
| SU | 1036593 | 8/1983 |
| WO | WO 95/18029 | 7/1995 |

WHEEL-ACTIVATED VEHICLE RESTRAINT SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation of application Ser. No. 08/562,912 filed on Nov. 27, 1995, now abandoned, which is a continuation-in-part of U.S. application Ser. No. 08/327,308 filed on Oct. 21, 1994, *now abandoned, which is related to FWC application Ser. No. 08/590,400* now issued as U.S. Pat. No. 5,582,498[(via FWC application Ser. No. 590,400)].

FIELD OF THE INVENTION

The invention relates generally to a system for restraining a vehicle adjacent a loading dock, and more specifically to a wheel-actuated vehicle chocking device.

BACKGROUND OF THE INVENTION

In the loading and unloading of vehicles at a loading dock, heavy equipment such as forklifts pass into and out of the vehicle to facilitate and expedite the unloading and/or loading of the vehicle. Accordingly, it is imperative that the vehicle remain in a fixed abutting relationship relative to the loading dock to prevent accidents, and to protect the safety of dock personnel. Without such securement, there is a potential hazard that the vehicle could be inadvertently moved away from the loading dock during the loading/unloading operation. If this were to occur without the knowledge of the dock personnel, they could continue to attempt to move cargo into or out of the vehicle assuming the presence of the vehicle at the dock, and injury to personnel or damage to dock equipment could occur.

Previous attempts to employ roadway positioned restraints to prevent the vehicle from prematurely moving away from the loading dock have been largely unsuccessful, or have several shortcomings. Attempts to place wheel blocks underneath and wedged in front of the vehicles' wheels have been unsuccessful because 1) the blocks are easily lost or damaged; 2) the blocks may not operate effectively due to a slippery road surface from oil, rain, ice, or snow; 3) the blocks are awkward to handle and sometimes difficult to remove from the wedged position; and 4) the blocks require the dock personnel manipulating the devices to be located on the roadway adjacent the dock requiring care to be exercised to avoid being injured by the vehicle.

Given the potential hazards of such manual placement of wheel chocks, automated chocking systems have been employed. While such systems are safer and more convenient than manual positioning of chocks, they may have their own disadvantages. For example, such systems may be incapable of being utilized with a wide variety of vehicle designs because they may interfere with the vehicle undercarriage, tailgate lifts, mud flaps or adjacent tires as they move into an engaging position with the wheel. In addition, such systems may not be adjustable to accommodate the large range of tire sizes on cargo vehicles. Such systems may also be awkward, difficult and time consuming to engage and disengage from the vehicle parked at the dock.

In the co-pending application Ser. No. 08/327,308 filed on Oct. 21, 1994, the priority benefit of which is hereby claimed, and which is assigned to the assignee of the present invention, a vehicle restraint was disclosed which avoided many of the shortcomings in the art. The wheel-activated restraint disclosed therein is actuated and positioned by the vehicle itself, and includes the feature of automatically adjusting to accommodate various sizes of tires. The invention disclosed herein represents improvements and enhancements to the design disclosed in application Ser. No. 08/327,308, the contents of which are expressly incorporated herein by reference.

Throughout this specification, the term "dock" or "loading dock" will be used to broadly refer to loading stations of all kinds, including raised loading docks, where positive and safe positioning of a vehicle is desired. Further, the vehicle may approach the loading dock over a variety of vehicle supporting surfaces. Herein, the vehicle will be described as approaching the dock over a "roadway". This term is meant to broadly encompass vehicle support surfaces of every kind including roads, driveways, ramps, bridges, pits, truck leveler surfaces, and the like.

SUMMARY OF THE INVENTION

It is a primary aim of the invention to enhance and improve upon the restraint disclosed in prior U.S. application Ser. No. 08/327,308.

In accordance with that aim, it is a primary object of the invention to provide a restraint device which is capable of accommodating vehicles of widely varying configurations and tire sizes.

A further object of the invention is to provide a restraint device which is compact and has a low profile for accommodating vehicles having low undercarriages or low tailgates.

It is a related object to provide a restraint with a low profile relative to the roadway such that, during actuation, the restraint does not interfere with any other portion of the vehicle beside the tire, i.e. ICC bars, tailgates, fenders, or mud flaps, thus insuring that the restraint properly contacts and restrains the tire.

It is a further object to provide a restraint that can accommodate itself to variations in height in the roadway surface while still maintaining adequate contact with both the roadway surface, and with the tire being engaged.

A further object of the invention is to provide a restraint that can be easily and effectively latched into place relative to the loading dock once the vehicle tire is chocked.

It is a related object of the invention to provide a latching system that can readily accommodate pullout forces exerted thereon by the docked and chocked vehicle.

It is a further related object that such pullout forces not be borne by the drive mechanism by which the system is initially latched.

A further object is to provide a restraint system including a visual or other indication of securement of the vehicle in the loading/unloading position.

A still further object of the invention is to provide a restraint system including the feature of guiding the vehicle into position relative to the restraint, so that proper activation and engagement of the tire is carried out.

In accordance with these and other objects of the invention, there is provided a wheel-activated vehicle restraint system for at least one wheel of the vehicle which restrains the vehicle at a loading/unloading position adjacent the dock. According to the preferred embodiment of the invention, the restraint includes a support structure disposed beside the path of the vehicle approaching the dock. The support structure includes a guide member extending away from the dock face, and a supporting member disposed above the guide member. A trigger assembly is operatively connected to the guide member, and initially engages the wheel of the vehicle as it rolls toward the dock. The restraint also includes a locking arm which operatively engages the supporting member to move from a stored position to a chocking position on the wheel as the wheel engages the trigger and moves it toward the dock. To provide such movement of the locking arm in response to movement of the trigger by the wheel, a trolley assembly operatively connects the trigger assembly and the locking arm, the trolley assembly and the locking arm being connected at a connection point. According to the invention, the trigger assembly is selectively positionable relative to the connection point in response to the dimensions of the wheel. As a result, the locking arm engages a bottom portion of the wheel, and moves along the peripheral surface of the wheel to a chocking position as the wheel continues to push the trigger assembly toward the dock. The movement of the locking arm along the peripheral surface of the tire minimizes or eliminates any interference between the vehicle undercarriage and the restraint.

In a preferred embodiment of the invention, the trolley assembly is connected to the trigger assembly by resilient members illustratively in the form of springs. The trolley assembly and springs thus serve as a variable length biasing link allowing the trigger assembly to be selectively positionable relative to the connection point between the trolley assembly and locking arm. As the trigger assembly is moved in a dockward direction, this variable length biasing link resiliently biases the locking arm from the stored position toward the chocking position. Moreover, the wheel is properly sized by the restraint and the locking arm traces out its advantageous path—first engaging a bottom portion of the wheel, and then moving along a peripheral surface of the wheel to the chocking position.

According to a further aspect of the invention, an operator actuated latching mechanism is provided to secure the vehicle in place adjacent the loading dock with the locking arm in the chocking position. An actuator is operatively connected to the latching bar for moving a latch member between a non-engaging and an engaging position. In the engaging position, a textured engaging portion of the latch member engages an upper surface of the guide member, while the engaging portion is spaced from the surface when it is in the non-engaging position. According to the preferred embodiment, engagement blocks are disposed on the trolley assembly such that the movement of the latch member to the engaging position causes the guide member to be clamped between the engaging portion and the engaging block. Advantageously, the structure of the latch mechanism is such that, as a pullout force is exerted on the restraint, the clamping force increases, and the latch member decouples from the latching bar, thus preventing the pullout force from being transferred to the actuator.

According to a further aspect of the invention, the latch mechanism also includes a sensor for sensing the movement of the latching bar between unlatched and latching positions. A first signal is generated when the latching bar moves to the latching position, and such signal may illuminate a visual indicator. The visual indicator signals dock personnel that the unloading/loading operation may be safely performed and/or signals the vehicle operator not to attempt to pull away. In addition, a second sensor may sense movement of the locking arm to the chocking position. A visual indicator that illuminates in response to signals from both the first and second sensors ensures not only that the latching mechanism is actuated, but also that the vehicle wheel is properly chocked.

Other objects and advantages of the invention will be apparent upon reference to the attached specification and drawings, wherein:

DESCRIPTION OF THE PREFERRED EMBODIMENTS

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

Figure 1:
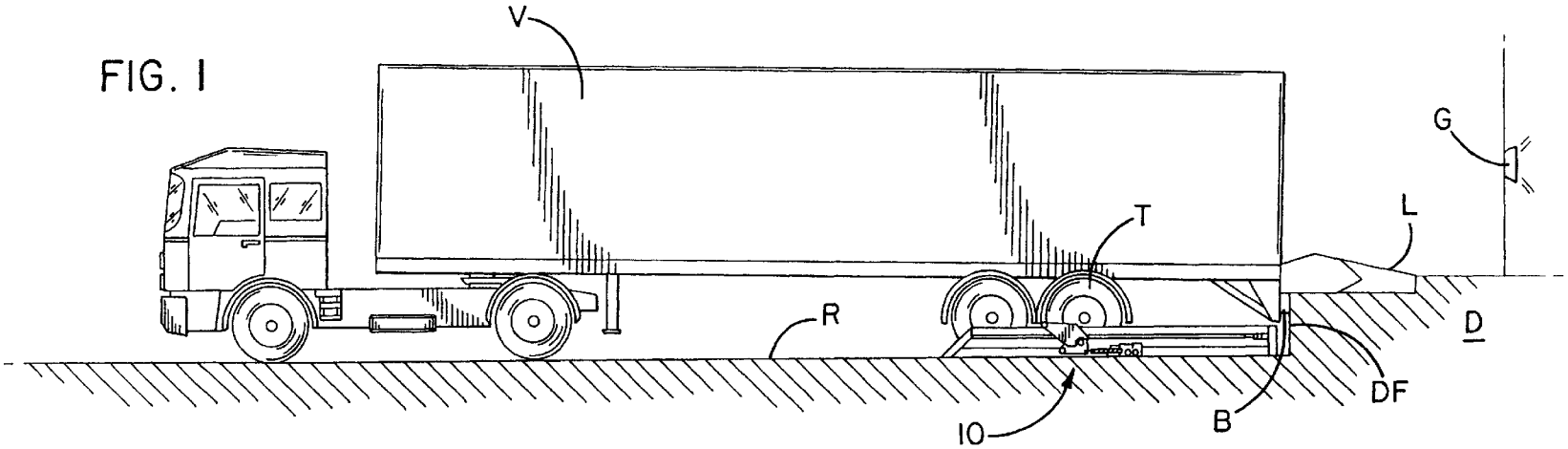
FIG. 1 is an elevational view showing a vehicle restraint according to one embodiment of the invention.

The tire-actuated vehicle restraint device according to the present invention is shown in an illustrative operating environment in FIG. 1. The restraint device 10 engages a leading tire T of a vehicle V to maintain the vehicle V in a loading/unloading position adjacent a loading dock D. The term "tire" as used herein refers to the combination of a wheel and a tire rotatably mounted to a vehicle V. Thus, an action performed on a tire is also performed on a wheel. Tire T is referred to as the "leading" tire as it is the first to approach the dock D as the vehicle V backs into position over the roadway R. As is conventional, the dock D shown in FIG. 1 includes a dock leveler L which spans the gap between the rear of the truck and the floor F of the loading dock to allow forklifts and other dock equipment and personnel to pass into and out of the bed of the vehicle. As the leveler L is pivoted relative to the dock, it also serves to compensate for height differentials between the bed of the truck and the floor F as may arise during loading and unloading of the vehicle V. As is also conventional, the dock D includes at least one bumper B mounted to the dock face DF. The rear end of the vehicle V may abut the bumper when it is in the loading/unloading position of FIG. 1.

The vehicle restraint 10 in FIG. 1 is shown in a chocking and latched position in which the restraint 10 prevents the vehicle V from moving away from the dock D while it is being loaded or unloaded. According to the invention, and as will be described in greater detail below, the restraint 10 is moved into the chocking position, in which a lock assembly engages the leading and trailing surfaces of the tire T, by means of the dockward movement of the tire T itself. Accordingly, the restraint 10 is referred to herein as "wheel-activated." In addition, the vehicle restraint 10 includes the feature of being variable to automatically accommodate and successfully chock tires having a wide range of sizes. Once the restraint is in the chocking position, in which a lock assembly engages tire T, the lock assembly can be latched into position relative to the dock D by an operator controlled latching mechanism. Once the operator controlled latching mechanism is activated, the restraint 10 actively prevents the vehicle V from moving away from the dock face. Conversely, de-activation of the operator controlled latching mechanism allows the vehicle to move away from the dock D after the loading/unloading operation is completed, thereby re-positioning the lock assembly back in the stored position for activation by the tire of the next vehicle.

Figure 2:
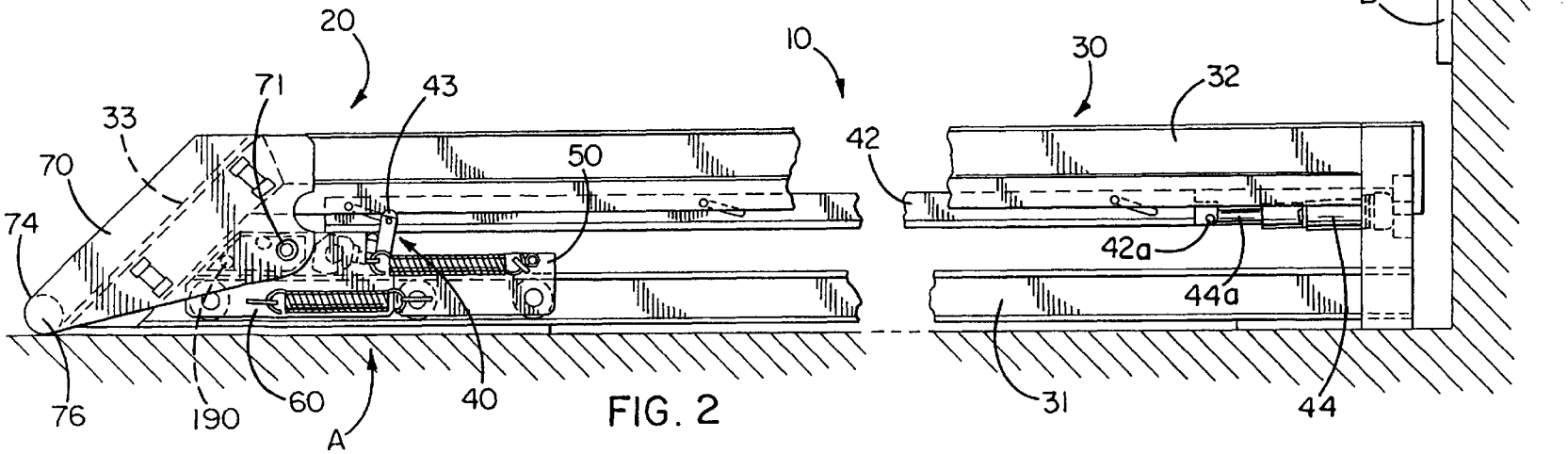
FIG. 2 is an elevational view of a restraint according to the invention, in the stored position.
Figure 4:
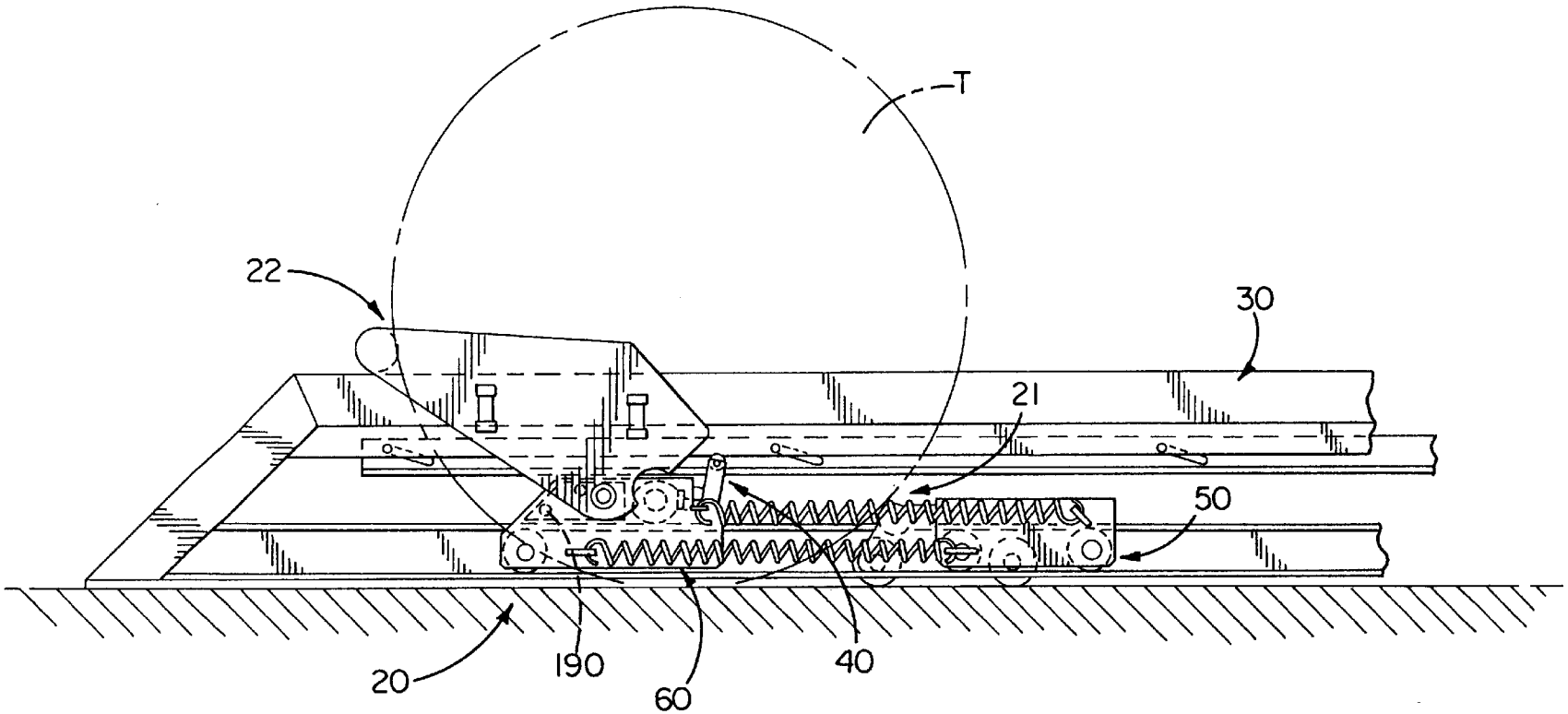
FIG. 4 is an elevational view of a restraint according to the invention, in the chocking position.
Figure 5:
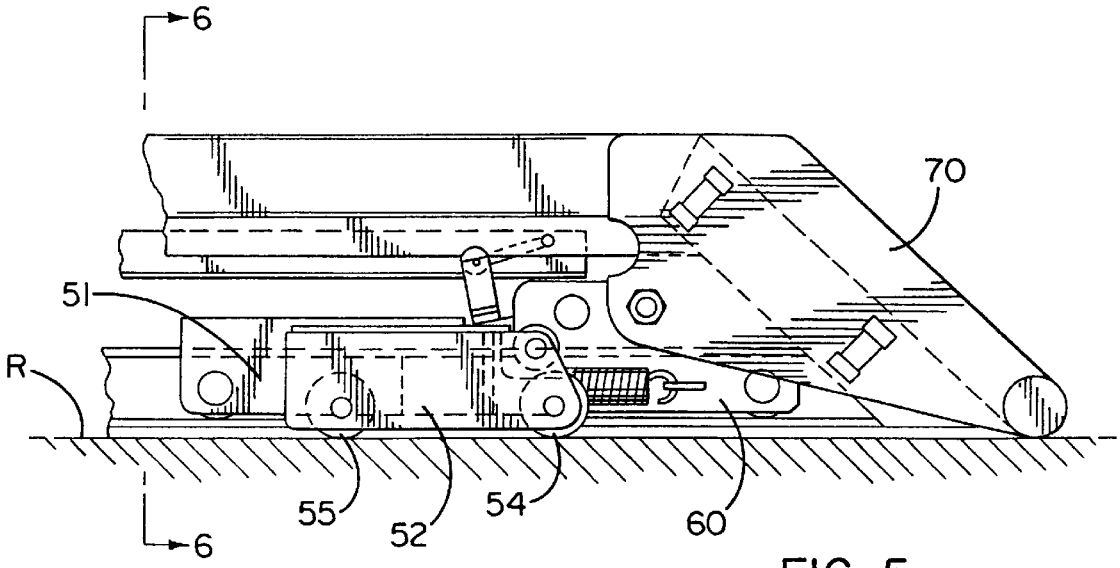
FIG. 5 is an elevational view of the restraint of FIGS. 2 and 4, but from the side which faces the vehicle.

The elevational view in FIG. 2 of the vehicle restraint 10 shows the various components comprising the restraint. A lock assembly 20 is shown in a stored position at the distal end of a support structure 30. The end of the support 30 furthest from the dock D will be referred to as the distal end, while the end adjacent the dock face will be referred to as the dock end. According to the invention, the lock assembly is activated by the tire T as it travels in a dockward direction over the roadway R. In response, the lock assembly moves along the support structure 30 from the distal, stored position shown in FIG. 2 to a plurality of chocking positions, such as that shown in FIGS. 1 and 4. The position shown in FIG. 4 is a chocking position, since the tire T is engaged on both its leading edge (as at 21) and at its trailing edge (as at 22). Once the lock assembly moves to this chocking position, further dockward movement of the tire T simply causes the lock assembly 20 to move dockward along with the tire. Once the tire T and the vehicle V are adjacent the dock in the loading/unloading position, the operator controlled latching mechanism may be actuated to latch the lock assembly 20 in place along the support structure, thus preventing movement of the docked vehicle V away from the dock.

Returning to FIG. 2, the support structure 30 includes a stationary member, illustratively in the form of a guide member 31 disposed adjacent to the roadway R. In the present embodiment, and as seen in the cross-sectional of FIG. 6, the guide member 31 is an I-beam including an upper flange, a lower flange and a vertical web portion, the space between the flanges forming a track on each side of the web. The I-beam is fixed to the roadway R in the present embodiment, although it could also be simply disposed along the roadway or spaced therefrom depending on the nature of the installation. Support structure 30 (FIG. 2) also includes a supporting member 32 which, in the present embodiment, is disposed above and separated from the guide member 31. In an alternative embodiment, the supporting member 32 could be in contact with guide member 31, or it could be integral therewith. At its distal end, the supporting member 32 includes a ramp portion 33 which is angled toward the roadway R. The upper surface of the ramp portion 33 serves as a camming surface to assist movement of the locking assembly 20 to the chocking position of FIG. 4, as described in greater detail below. The restraint 10 also includes the operator actuated latching mechanism 40. The latching mechanism 40 includes a latching bar 42, shown depending from the supporting member 32 in FIG. 2. The latching mechanism 40 also includes a latching member 43. The latching mechanism 40 is actuated by an actuator 44 shown mounted to the support structure 30.

Figure 3:
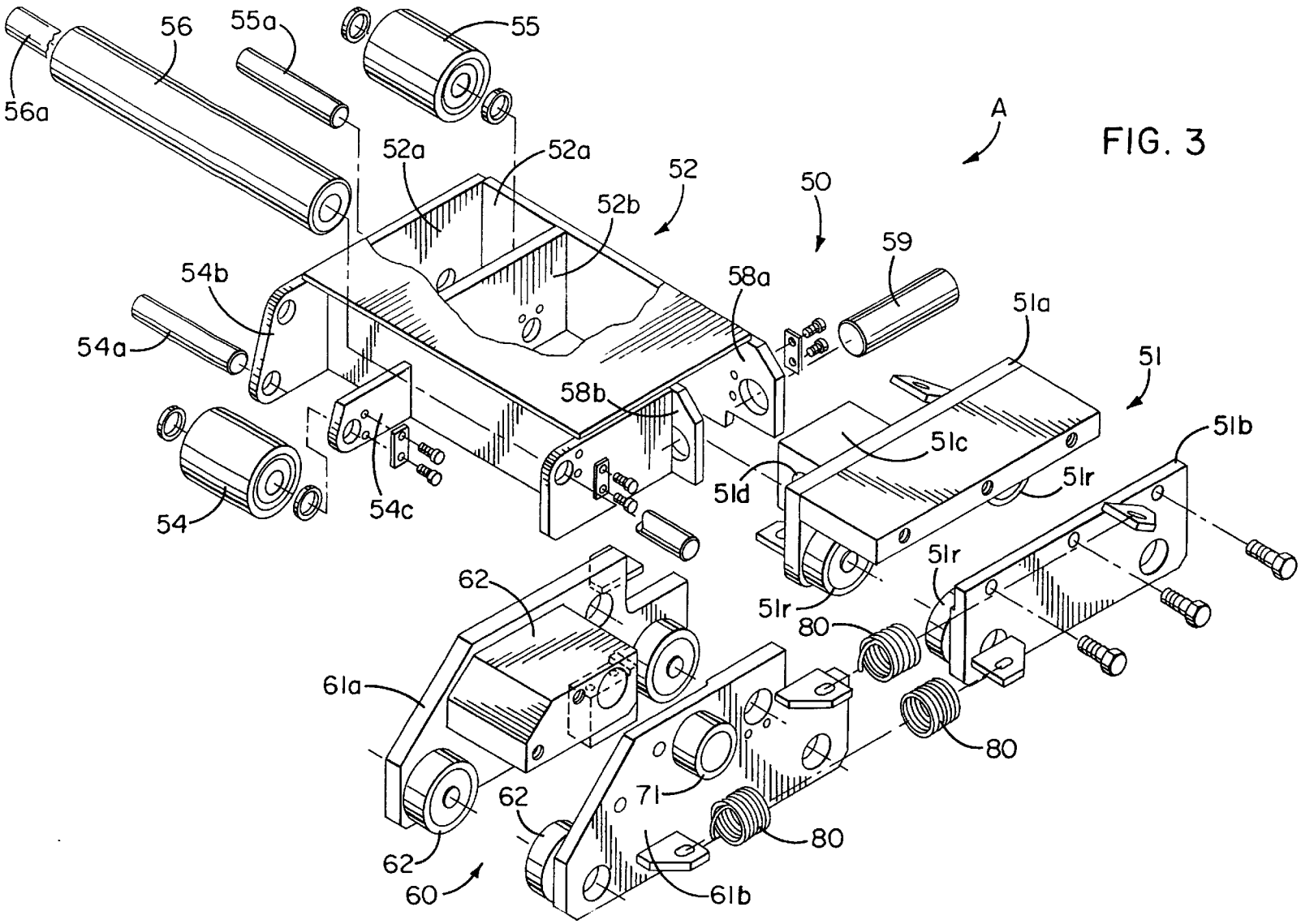
FIG. 3 is an exploded view of the actuation assembly according to an embodiment of the invention.

The lock assembly 20 includes an actuation assembly, designated generally by A in FIG. 2, and shown in an exploded view in FIG. 3, and a locking arm 70 (also referred to as a lagging arm or chock assembly). The actuation assembly A moves relative to and along the support structure 30, and serves to actuate the locking arm 70 between the stored position of FIG. 2 and the chocking position of FIG. 4 in response to the dockward movement of the tire T as the vehicle V backs in to the loading/unloading position adjacent the dock. At the same time, the structure of the actuation assembly A serves to properly size the tire T and capture the leading edge at an engagement point 21 in FIG. 4, while moving the locking arm 70 to capture the trailing edge of the tire as at 22 in FIG. 4.

To achieve the automatic positioning function and the tire sizing function, the actuation assembly A includes a trigger assembly 50, and a trolley assembly 60. Both the trigger assembly 50 and the trolley assembly 60 move linearly along the guide member 31 between the stored position of FIG. 2 and a plurality of chocking positions, such as that shown in FIG. 4. The trigger assembly 50 also engages and moves along the roadway surface R in response to movement of the tire T. Toward that end, the trigger assembly 50 comprises a guiding portion 51 and a tire-engaging portion 52, seen most clearly in the exploded view of FIG. 3. To allow the trigger assembly 50 to move along the guide member 31, the guiding portion, according to the present embodiment, includes sidewalls 51a and 51b, to which are secured rollers 51r. Rollers 51r are received within the tracks formed in the I-beam 31 between the top flange and bottom flange to guide the movement of the trigger assembly 50, as seen most clearly in the section view of FIG. 6. In a like manner, and returning to FIG. 3, the trolley assembly according to the present embodiment also includes sidewalls 61a and 61b, to which are secured rollers 62. These rollers are also disposed within tracks in the I-beam 31 to guide the movement of the trolley assembly 60 along the I-beam guide member 31.

The tire-engaging portion 52 of the trigger assembly 50 according to the present embodiment includes a generally box-like structure defined by sidewalls 52a (FIG. 3), and supported by transverse webs, such as at 52b. A plurality of rollers are secured to the tire-engaging portion to assist in its function. Roadway-engaging rollers 54 and 55 are secured to the box-like structure to provide a smooth rolling action as the tire-engaging portion 52 passes over the roadway surface R. The rollers 54 and 55 are illustratively mounted for rotation on shafts 54a and 55a, respectively, the ends of which are received within holes disposed within vertical members 54b and 54c and 52a and 52b, respectively. While the rollers 54 and 55 are described herein as cylindrical, other rollers, such as a spherical caster mounted on a horizontal shaft, could also be used. Tire-engaging portion 52 also includes a tire-engaging roller 56, extending across the width of the box-like structure in the present embodiment. Since the dockward travelling tire will engage the roller 56 at an engagement point 21 (FIG. 4), the ability of this roller to rotate ensures that the tire T will not roll up and over the tire-engaging portion 52. Rather, the tire will roll against the roller 56, and the tire-engaging portion 52 will be pushed dockward under the influence of the tire T. Of course, this function of roller 56 assumes that the tire-engaging portion 52 is not somehow obstructed from moving in a dockward direction. According to an aspect of the invention, however, the projection or profile above the roadway R is small enough that the tire could pass over the tire-engaging portion 52 in the event of a large enough roadway obstruction such as would prevent dockward movement of the tire-engaging portion 52. At the same time, the tire engaging portion 52 according to the invention includes a feature to help prevent any obstructions and/or roadway irregularities from impeding its movement as activated by the tire T.

Figure 6:
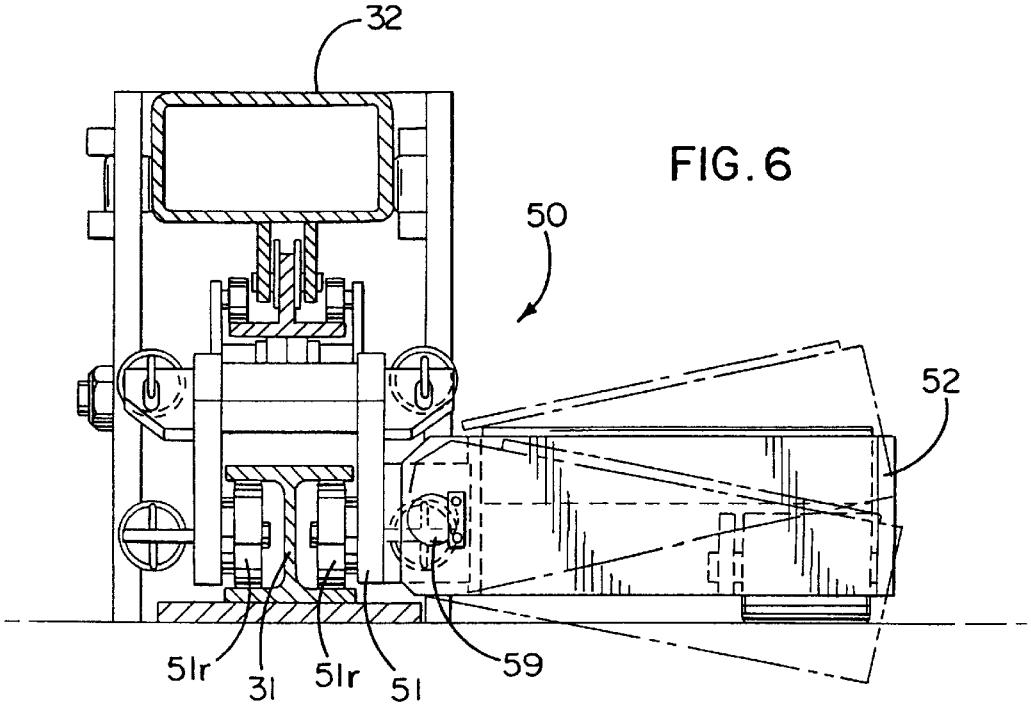
FIG. 6 is a rear view of the restraint of FIG. 5, as indicated in FIG. 5.

According to this feature, which forms a significant aspect of the present invention, the tire-engaging portion is vertically displaceable relative to the guide portion 51 of the trigger assembly 50. In the present embodiment, this vertical displaceability is provided by the tire-engaging portion being pivotal about a horizontal axis relative to the guide portion 51. The pivoting nature of the tire engaging portion 52 is best seen in FIG. 6. In that Figure, the portion 52 is shown in its normal orientation in solid lines. It is also shown in both a pivoted up and a pivoted down configuration in broken lines. By virtue of the fact that the tire-engaging portion can pivot in this manner, roadway obstructions or irregularities that would otherwise impede the travel of the tire-engaging member 52 or that would place member 52 in an unsupported, cantilevered position, may be avoided. For example, if the roadway surface included a bump between the present position of the tire-engaging portion 52 and the dock, the bump could prevent further movement of the portion 52 toward the dock in the absence of this feature. Instead, the portion 52 can pivot and simply roll up and over the bump. This not only ensures that the portion 52 can continue toward the dock, but also ensures that proper engagement of the tire-engaging roller 56 with the tire T is maintained. Similarly, if the roadway surface R were to include a depression, the portion 52 could pivot downwardly to maintain contact with the roadway R as it passed over the depression. At the same time the roller 56 would maintain proper contact with the trailing edge of the tire T.

In the present embodiment of the invention the pivoting of the tire-engaging portion 52 relative to the guide portion 51 is provided by a block 51c (FIG. 3) fixed to a sidewall 51a of the guide portion 51. The block 51c includes a central through-hole 51d. The block 51c is disposed between two vertical members 58a and 58b on the tire engaging-portion 52, each including mounting holes for a shaft 59. When these components are assembled the tire-engaging portion 52 can pivot about a horizontal axis defined by the shaft 59 to assume the various positions shown in FIG. 6. Of course, other means for providing this pivotal motion or general vertical displaceability of the tire-engaging portion 52 relative to the guide portion 51 will be apparent to those of skill in the art and are within the scope of the invention.

Figure 7:
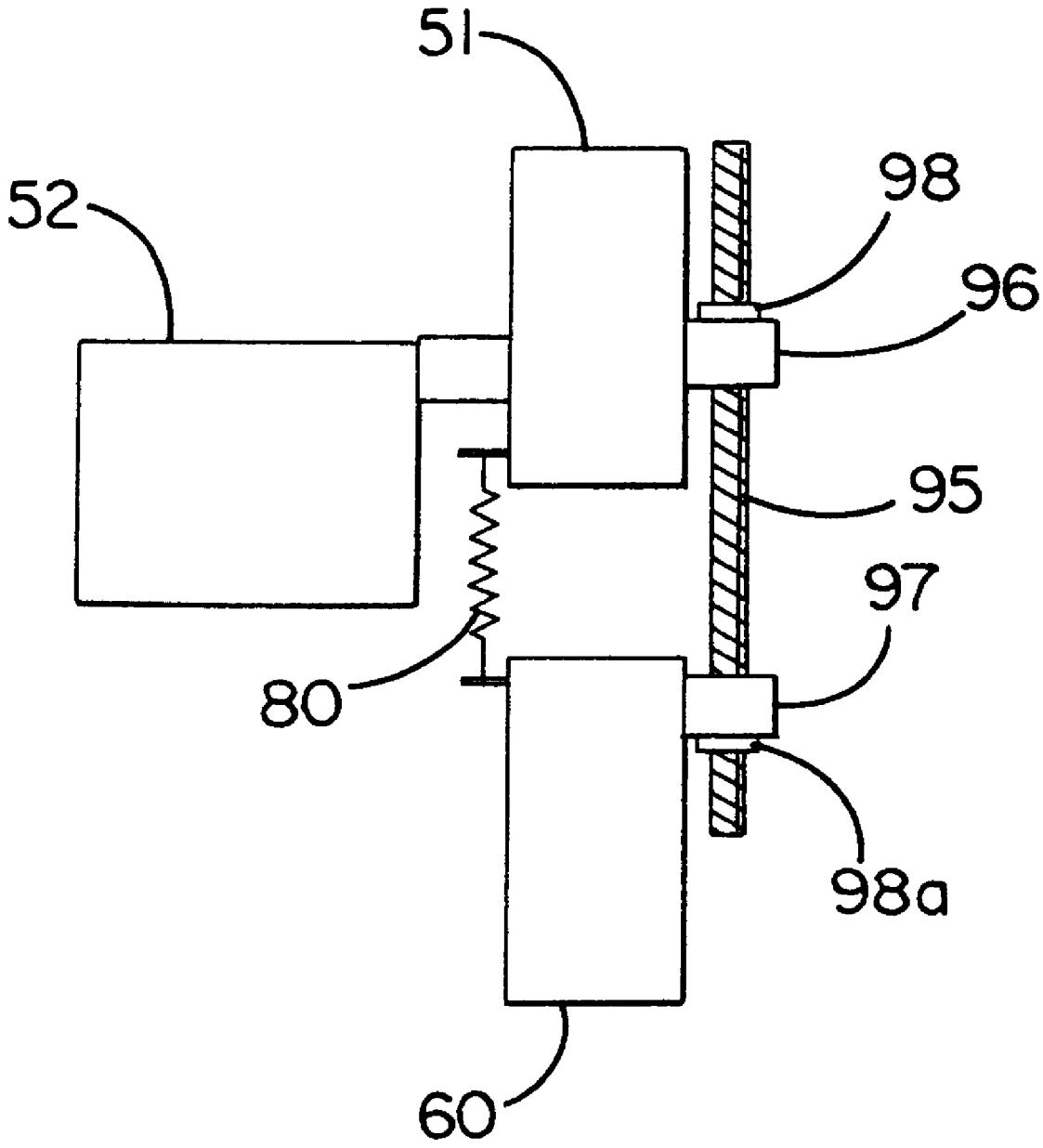
FIG. 7 is a plan view of the restraint according to an alternative embodiment of the invention.

Returning to FIGS. 2 and 3, it can be seen that the trigger assembly and the trolley assembly are operatively connected to each other by resilient means illustratively in the form of springs 80, two of which are shown partially in FIG. 3. Trolley assembly 60 and trigger assembly 50, according to the present embodiment, each include spring tabs for receiving the respective ends of the springs 80. The springs 80 allow the trigger assembly 50 to move relative to the trolley assembly 60 until the springs exert a sufficient force on the trolley assembly to move the trolley assembly in a dockward direction. As will be described in greater detail below, this action allows the actuation assembly A to adjust to properly size and engage the tire T of the vehicle V as it backs toward the loading/unloading position. According to an alternative embodiment of the invention a limiting assembly comprising a stop bar is provided between the guide portion 51 and the trigger assembly 60. The stop bar is provided to limit the maximum separation between the trigger assembly and the trolley to a predetermined distance governed by the maximum available travel (stretch) of the springs 80. As seen in the highly simplified plan view of FIG. 7, the stop bar 95 is a threaded member in this embodiment, and extends between the guide portion 51 and the trolley assembly 60. The stop bar passes through holes in blocks 96 and 97 fixed to the guide portion and trolley assembly 60, respectively. The maximum separation distance is defined by lock nuts 98 and 98a. If the maximum separation is reached, the stop bar 95 causes the trolley assembly 60 to be pulled by guide member 51 without further stretching of springs 80.

As can be seen in FIG. 2, the locking arm 70 is disposed distally of the trigger assembly 50 and is operatively connected to the trolley assembly 60. In the present embodiment, this operative connection is at a connection point, designated 71 in FIG. 2 and, which in the present embodiment comprises a pivotal connection. According to a significant aspect of the invention, the connection point 71 and the trigger assembly 50 are selectively positionable relative to each other, since the trigger assembly 50 can move in a dockward direction without movement of the trolley assembly 60 or the locking arm 70. This selective positioning of the trigger assembly 50 relative to connection point 71 allows the locking arm 70 to initially engage a bottom portion of the tire as the locking arm moves away from its stored position, and then to move along the peripheral surface of the tire T until the locking arm is in its chocking position, as shown in FIG. 4. This selective positioning of the trigger and connection point, and movement of the locking arm 70 along the peripheral surface of the tire T will be described in greater detail below.

Figure 8:
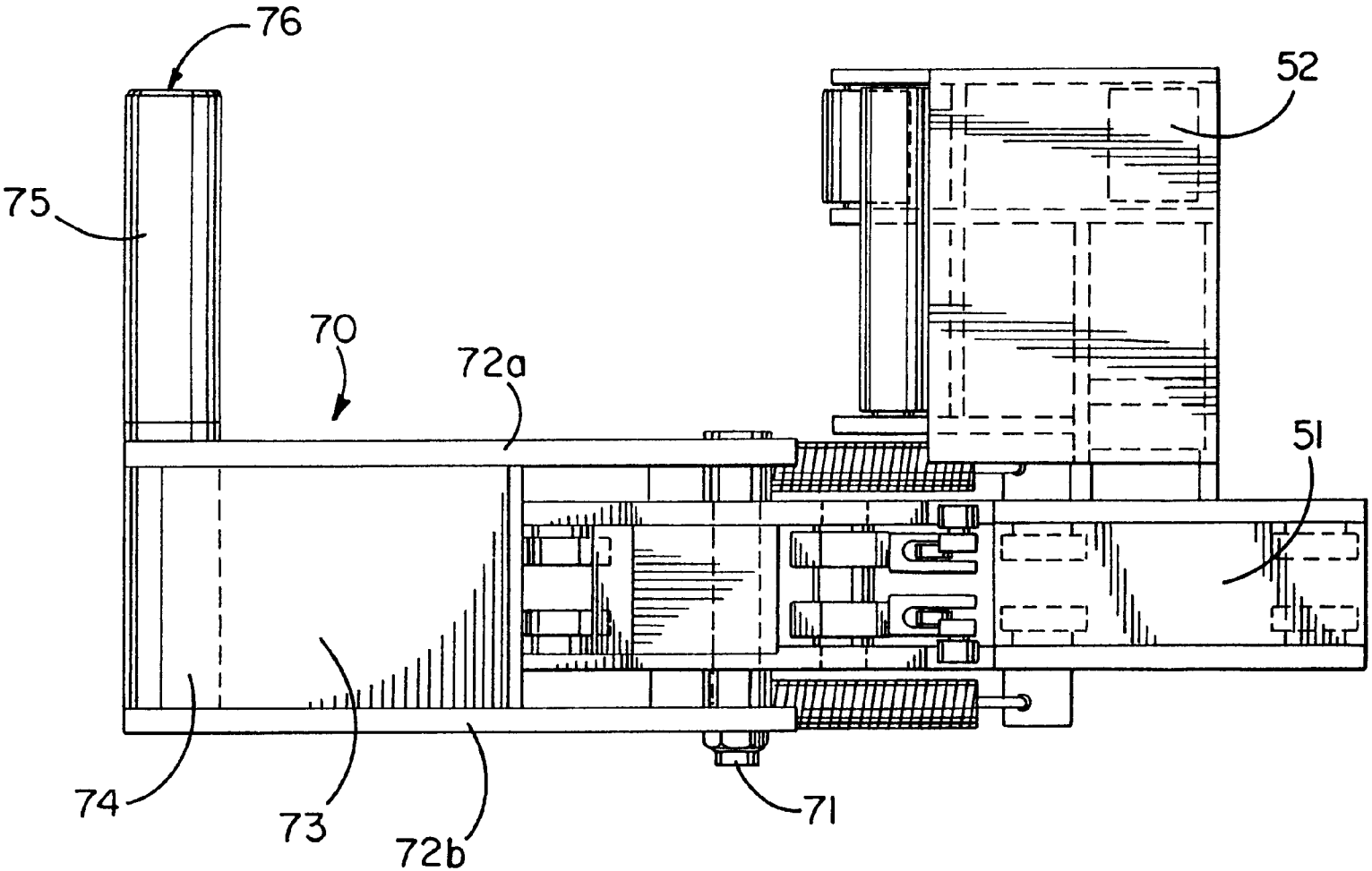
FIG. 8 is a top view of the restraint according to an embodiment of the invention.

The locking arm 70 includes a proximal end (relative to the dock) adjacent the connection point 71 to the trolley assembly 60. The locking arm 70 also includes a first roller 74 disposed at its distal end. As seen in the top view of FIG. 8, the locking arm also includes a second roller 75 disposed at the distal end of the locking arm and projecting away from the support structure into the path of the tire T along the roadway R. Preferably roller 74 and roller 75 are on a common shaft 76. As is also clear from FIG. 8, the locking arm, according to the present embodiment includes side-plates 72a and 72b and a top plate 73.

The locking arm 70 according to the invention, is intended to move from the stored position of FIG. 2 to the chocking position of FIG. 4 as the actuation assembly A (comprising trigger assembly 50 and trolley assembly 60) moves in a dockward direction as activated by tire T. Referring to FIG. 2, as the trolley assembly moves in a dockward direction, the connection point 71 between the trolley 60 and the locking arm 70 also moves dockward. This in turn causes the first roller 74 to begin moving along the top camming surface of the ramp portion 33 of the supporting member 31. Since roller 74 ensures smooth movement of arm 70 along the supporting member 31, it could be replaced with a low friction, stationary member. As the roller 74 continues upward along the camming surface, it also rotates about the pivotal connection point 71. As the trolley assembly 60 continues dockward, the roller 74 reaches the top of the camming surface on the ramp portion 33, and engages the generally horizontal top surface of the supporting member 32. The locking arm is now in the chocking position shown in FIG. 4. Further dockward movement of the trolley assembly does not change the orientation of the locking arm relative to the trolley assembly 60. Rather, the locking arm simply stays in the chocking position of FIG. 4, and continues to move in a dockward direction.

Figure 9:
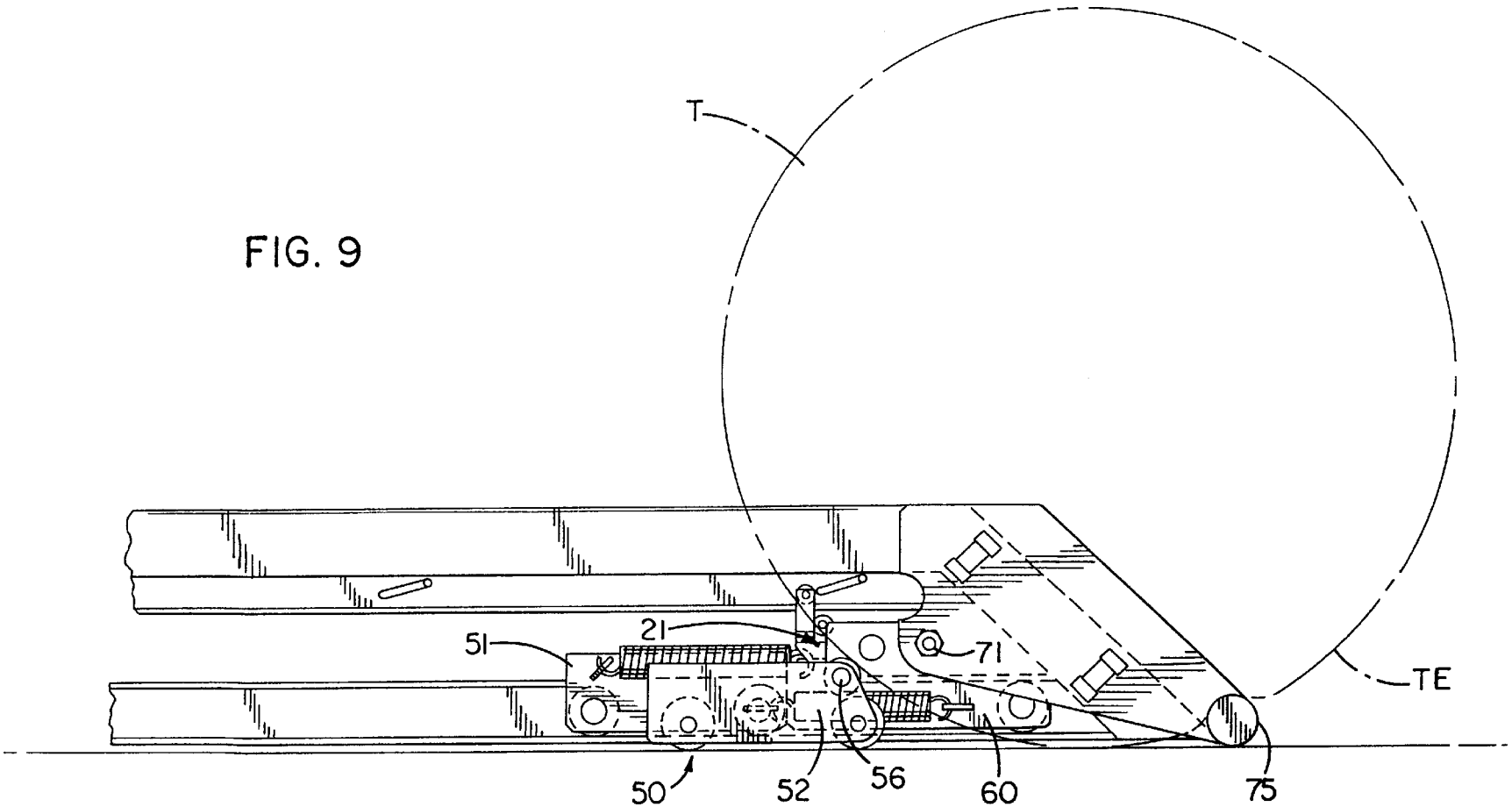
FIGS. 9–12 are a series of partial elevational views representing movement of a restraint according to the invention moving between the stored and chocking positions.
Figure 10:
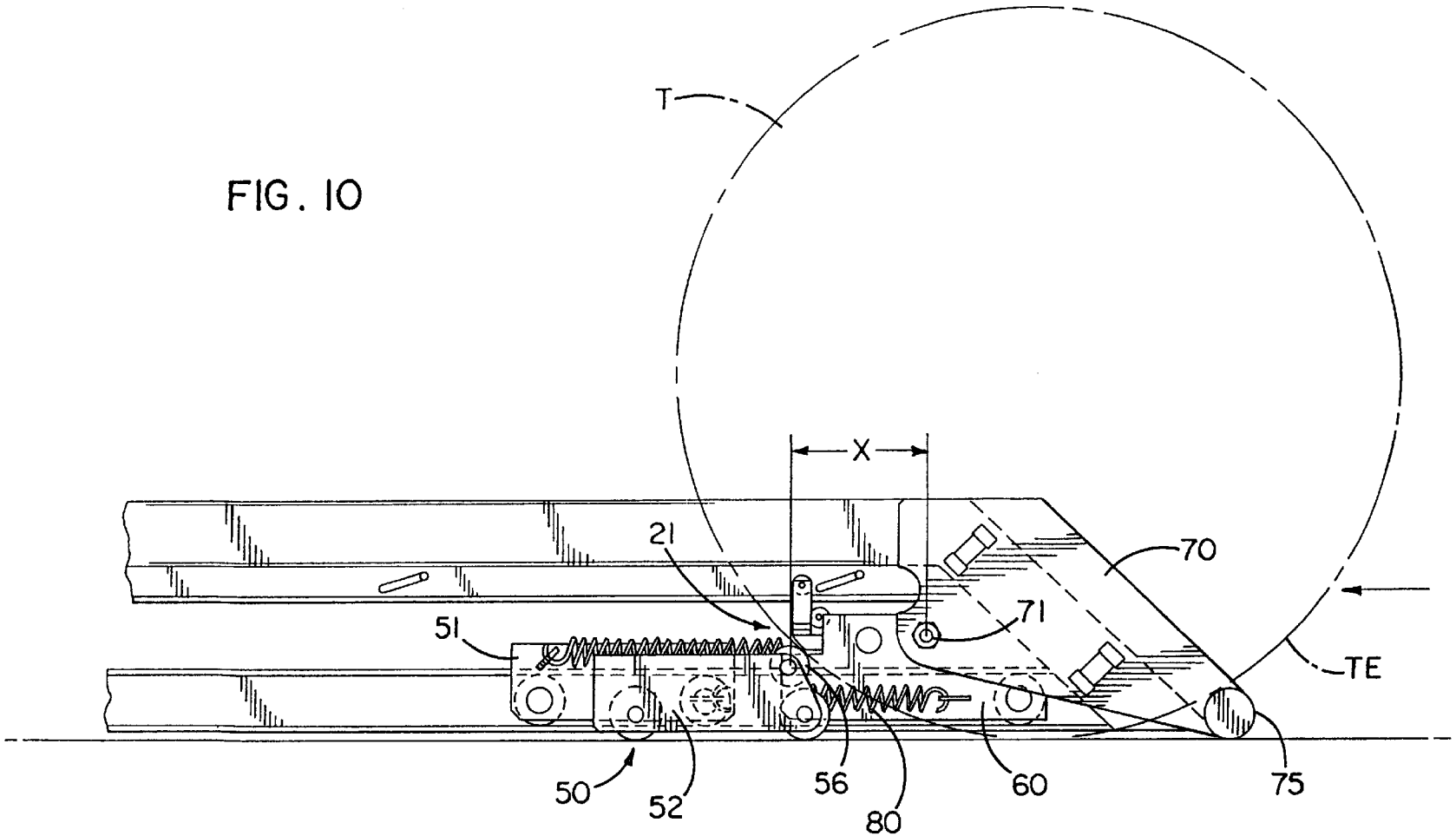
Figure 11:
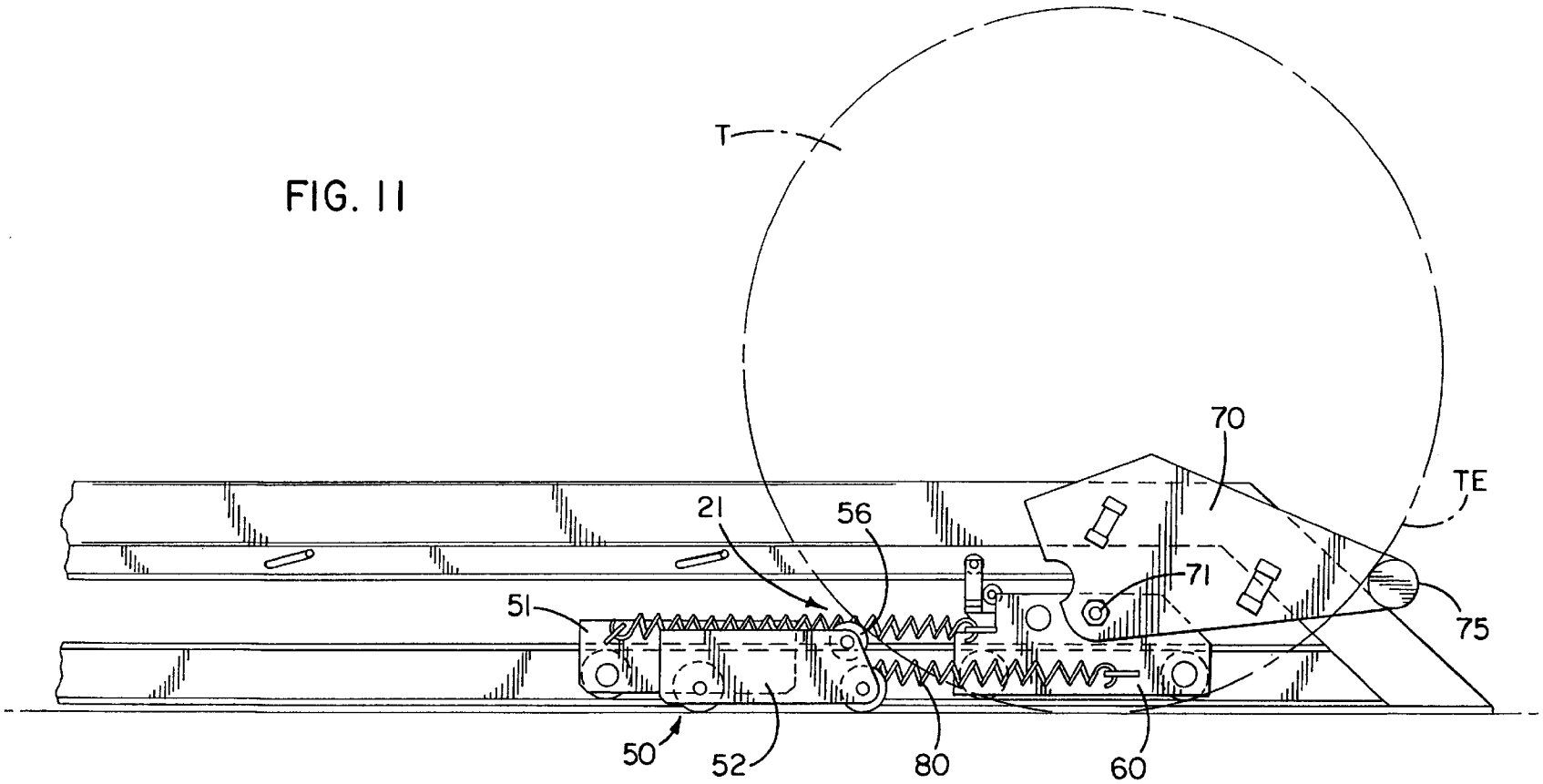

As the locking arm 70 was moving from the stored position to the chocking position as just described, the attached second roller 75 (FIG. 8) was moving along with it. As will now be described in greater detail with reference to FIGS. 9–12, such movement, as effected by movement of the trigger assembly and trolley assembly as activated by the tire T, properly sizes and chocks the tire T and allows the roller 75 to initially engage a bottom portion of the tire and move along the peripheral surface of the tire to the chocking position shown in FIG. 12. FIG. 9 shows the tire T as it first engages the trigger assembly 50 by contact at an engagement point 21 with the tire-engaging roller 56. Since the locking arm 70, and the second roller 75, are disposed distally (to the right in the sense of FIG. 9) relative to the trolley assembly, the tire T is now disposed between the roller 75 and the trigger assembly 50. For a tire having the size shown in FIG. 9, continued dockward movement of the tire T moves the trigger assembly 50 in a dockward direction, as seen in FIG. 10. Neither the trolley assembly nor the locking arm yet move, however, because the trailing edge TE of the tire T is preventing the roller 75 from moving upward. As a result, the springs 80 are stretched as the trigger assembly 50 moves relative to the stationary trolley assembly and locking arm. By virtue of this movement, the connection point 71 and the trigger assembly 50 are positioned relative to each other by the physical dimensions of the tire T. In particular, by virtue of the fact that tire T prevents movement of the locking arm 70 in the FIG. 10 position, the "relative" movement between trigger 50 and connection point 71 at this point of operation is movement of trigger 50 relative to the stationery connection point 71.

Figure 12:
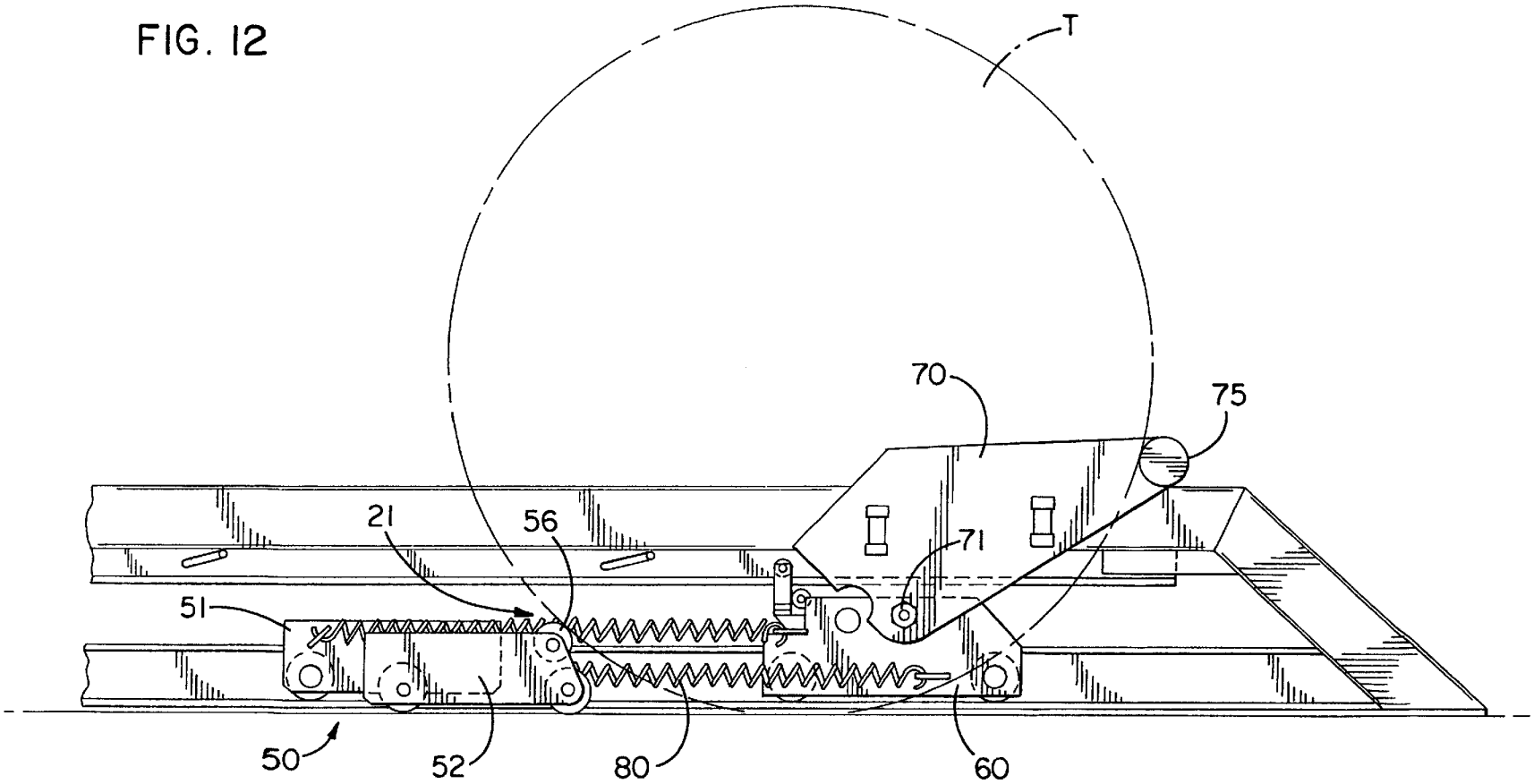

As the tire T continues dockward, the trailing edge TE no longer prevents movement of the roller 75 and locking arm 70. Accordingly, the force exerted by the springs 80 on the trolley assembly 60 begins to pull the trolley in a dockward direction. As described in detail above, such dockward movement of the trolley assembly 60 causes the locking arm 70 to begin moving from its stored position (FIG. 9) toward the chocking position, such initial movement being shown in FIG. 11. The locking arm is thus resiliently biased from the stored position to a chocking position and moves to the chocking position by the engagement between the tire and the trigger mechanism 50. As the locking arm 70 begins this movement, the roller 75 engages a bottom portion of the trailing edge TE of the tire T. As the locking arm 70 continues moving toward the chocking position, the second roller 75 of the locking arm 70 moves along and maintains contact with the peripheral surface of the tire T. During this operation, the separation between the connection point 71 and the trigger assembly 50 may increase as more of the tire T is positioned therebetween. This is a further example of selective positioning between the trigger 50 and connection point 71. As the tire continues toward the dock, the trigger assembly 50 continues dockward, and through the springs 80, pulls trolley assembly 60 such that the trigger and trolley move together and effect the continued movement of the locking arm 70 to the chocking position, as shown in FIG. 12.

Once the locking arm 70 is in the chocking position, further dockward movement of the tire T simply translates the lock assembly 20 further dockward, as it is maintained in the chocking position. When the vehicle V is backed all the way up to the dock in the loading/unloading position, the operator actuated latch mechanism 40 is actuated to latch the lock assembly in place along the support structure 30 to prevent movement of the vehicle V away from the dock.

The structure of the lock assembly 20 thus provides the advantageous feature which allows the roller 75 of the locking arm 70 to engage a bottom portion of the tire, and then move along the peripheral surface of the tire to a chocking position. This feature is provided primarily by the connection point 71 and the trigger assembly 50, more particularly the first engagement point 21, being selectively positionable relative to each other in response to the dimensions of the tire T. In the example shown in FIGS. 9–12, the connection point 71 was separated from the engagement point 21 by a distance "X" depicted in FIG. 10 at the time when the locking arm first began moving toward the chocking position from the stored position. For a smaller tire, the engagement point 21 would have been spaced a smaller distance "X" from the connection point 71 when the locking arm began to move up the camming surface of the supporting member 31, and along the peripheral edge of the tire T. By the same token, for a larger tire, the trigger assembly 50, and thus the engagement point 21 would have moved further left in the sense of FIG. 10, and the engagement point 21 would have been spaced a larger distance "X" from the connection point 71 before the locking arm began moving from the stored position toward the chocking position. Thus, the connection point 71 and the trigger assembly 50 are selectively positionable relative to each other and in response to the dimensions of the tire T as it engages the lock assembly 20.

This selective positioning is provided primarily by the resilient connection between the trolley assembly 60 and the trigger assembly 50. As the trolley is connected to the locking arm 70 at the connection point 71, the trolley assembly 60 and springs 80 form a variable length biasing link connecting the connection point 71 to the trigger assembly 50. This allows the distance between the connection point 71 and the engagement point 21 on the trigger assembly to vary in response to the dimensions of the tire T. The resulting movement of the roller 75, wherein it engages a bottom surface of the tire, and then moves along the peripheral surface of the tire to a chocking position is advantageous as it minimizes or eliminates any interference with the vehicle undercarriage or any other obstructions on the vehicle as the locking arm moves to the chocked position.

To secure the vehicle V adjacent the loading dock, the restraint 10 according to the invention includes an operator actuated latching mechanism 40, shown in detail in FIGS. 13–16. The latching mechanism 40 is actuated to latch the lock assembly 20 into position along the support structure 30 when the lock assembly is in a chocking position as shown in FIG. 4, and once the vehicle V has backed into the loading/unloading position adjacent the dock D. The latching mechanism 40, according to the present embodiment, latches the lock assembly in position along the support structure by selectively securing the trolley assembly 60 to the guide member 31 along which the trolley assembly moves. Since the locking arm 70 is operatively connected to the trolley assembly 60, the securement of the trolley assembly 60 to the guide member 31 also prevents movement of the locking arm 70 in a direction away from the dock. Movement of the vehicle V away from the dock is thus prevented.

To secure the trolley assembly 60 to the guide member 31, a latch member 43 is provided which is operatively connected to the trolley assembly 60. In the present embodiment, the latch member is pivotally connected to the trolley assembly 60 through a pivot axis designated 100 in FIG. 13. As can be seen in greater detail in the section view of FIG. 16, the latch member 43 may be received on pivot axis 100 depicted by pivot shaft 105, which in turn is received in holes in the sidewalls 61a and 61b of the trolley assembly 60. According to the present embodiment, the latch member 43 is formed in two halves 43' and 43", seen in FIG. 16, and which move independently of each other. The two halves 43' and 43" are also shown in the plan view of FIG. 17. Each half includes a body portion B and a side arm S, the body portion B being disposed about the pivot shaft 105. Each side arm S also includes a roller 170 attached thereto, and to be discussed in greater detail below. In an alternative embodiment of the invention, the latch member 43 could be a unitary member including a connecting section which would connect the two body portions B about the shaft 105. As the operation of the two separated halves 43', 43" or the unitary latch member would be the same, the collective term "latch member" will be used to describe the structure and function of this component. Returning to FIG. 13, the latch member 43 includes at least one engaging portion 110. In the present embodiment, each half 43' and 43" of the latch member 43 includes such an engaging portion.

Figure 13:
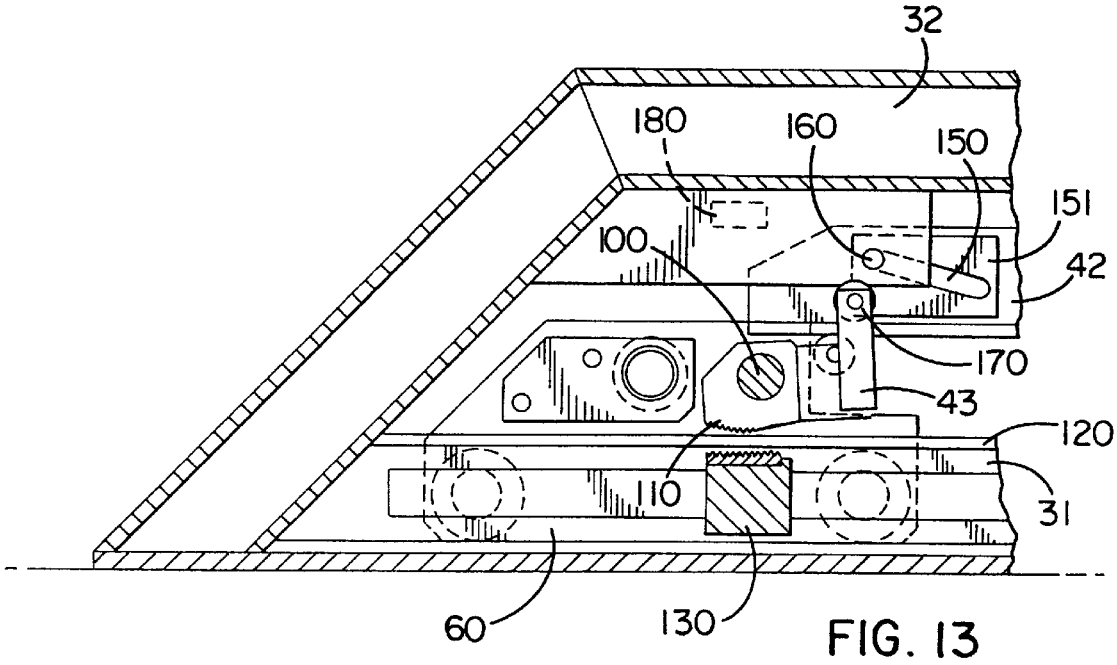
FIGS. 13–15 are a series of partial elevational views representing the operating positions of a latch mechanism according to an embodiment of the invention.
Figure 14:
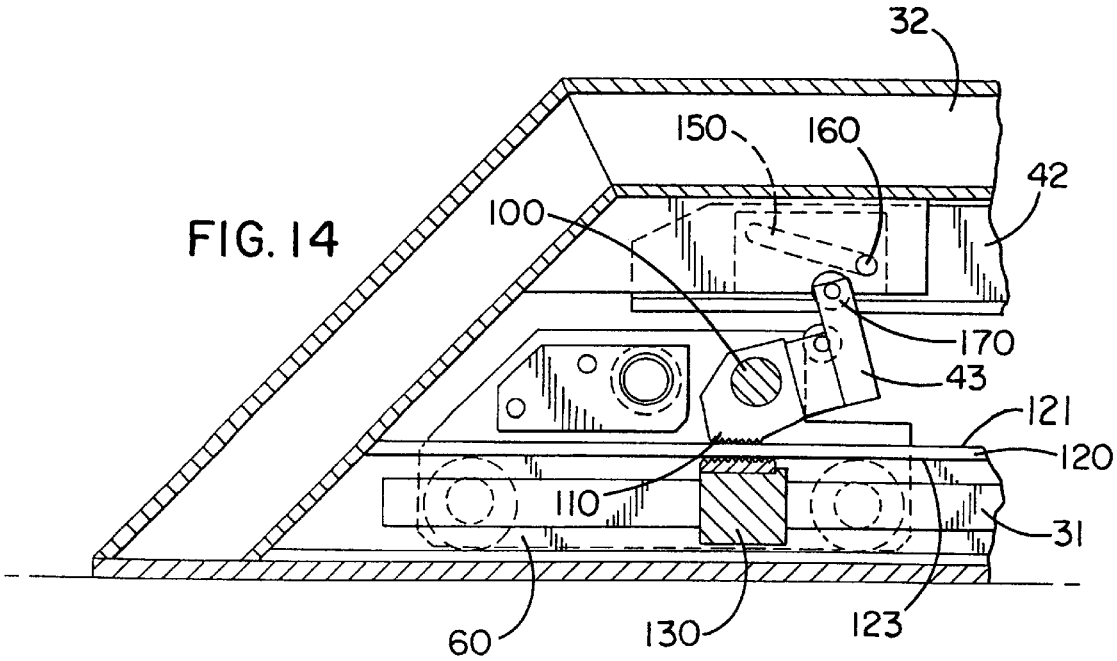
Figure 15:
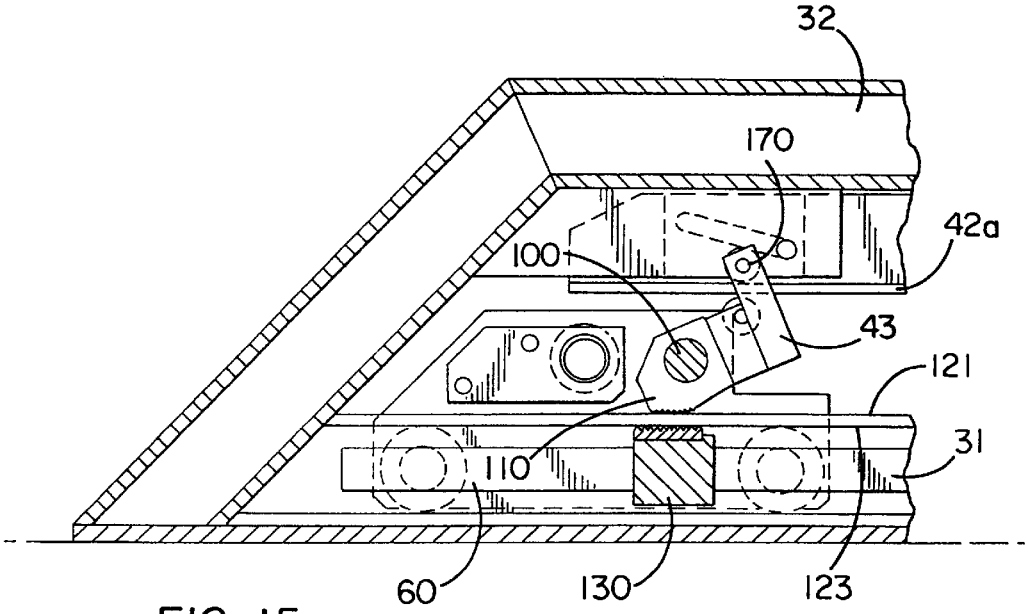
Figure 18:
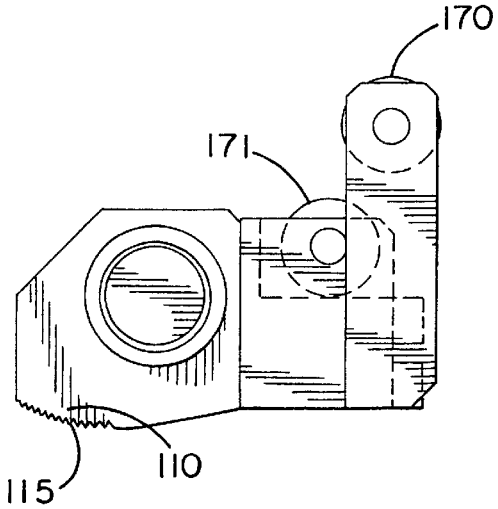
Figure 19:
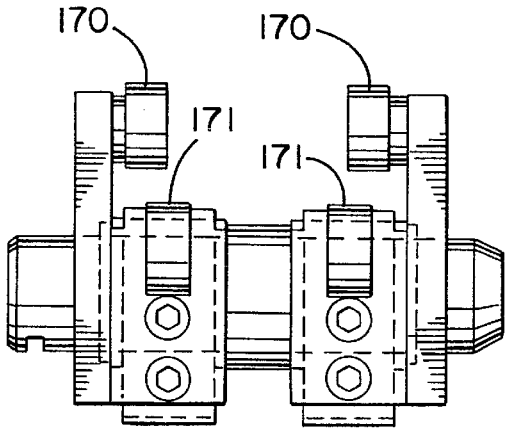

To secure the trolley assembly 60 to the guide member 31, the latch member 43 is movable relative to the trolley assembly between a non-engaging position, shown in FIG. 13, and an engaging position, shown in FIG. 14. In the engaging position, the engaging portion 110 of the latch member 43 engages the top flange 120 of the guide member 31. The guide member 31 which, according to the present invention is an I-beam, can be seen more clearly in the section view of FIG. 16. The frictional engagement between the engaging portion 110 and the top surface 121 of the flange 120 is enhanced by the portion 110 including a textured surface 115, illustratively a toothed surface. The toothed surface 115 can be seen most clearly in the side view of the latch member 43 shown in FIG. 18. In the non-engaging position shown in FIG. 13, the engaging portion 110 of the latch member 43 is spaced from the flange 120, thus allowing the trolley assembly to move freely along the guide member 31.

While the frictional engagement between the engaging portion 110 of the latch member 43 and the surface 121 may be sufficient to secure the trolley assembly 60 and the attached locking arm 70 in place along the support structure, the latching mechanism according to this embodiment of the invention also includes a structure that clamps the trolley assembly to the guide member 31. Toward that end, the trolley assembly 60 includes at least one engaging block 130 operatively connected thereto. In the present embodiment, an engaging block 130 is connected to each of the sidewalls of the trolley assembly, with a block 130 corresponding to each of the two halves 43' and 43" of the latch member 43. As seen in FIG. 13, and in the section view of FIG. 16, an engaging block 130 is connected to the trolley assembly 60 such that the block is adjacent to, but spaced from the upper flange 120 when the latch member 43 is in the non-engaging position of FIG. 13. Upon movement of the latch member 43 to the engaging position of FIG. 14, however, the engaging block 130 moves to a position wherein it engages the bottom surface 123 of the upper flange 120 of the guide member. As the latch member 43 rotates to the engaged position, the engaging surface 110 contacts the upper surface 121 of the flange 120. Further rotation of the latch member 43 causes the latch member to exert an upward force on the pivot shaft 105 connecting the latch member 43 to the trolley assembly 60. This upward force is translated to the sidewalls of the trolley assembly and thus to the engaging blocks 130 attached thereto. Thus, by virtue of the movement of the latch member to the engaging position, the upper flange 120 of the guide member 31 is clamped between the engaging portion of the latch member 43 and the engaging block or blocks 130, and the trolley assembly 60 and attached locking arm 70 are secured in place along the support structure 30. As with the engaging portion, the surface of the engaging blocks 130 which engage the flange 120 are textured to enhance friction. Preferably, the surface is toothed.

Figure 16:
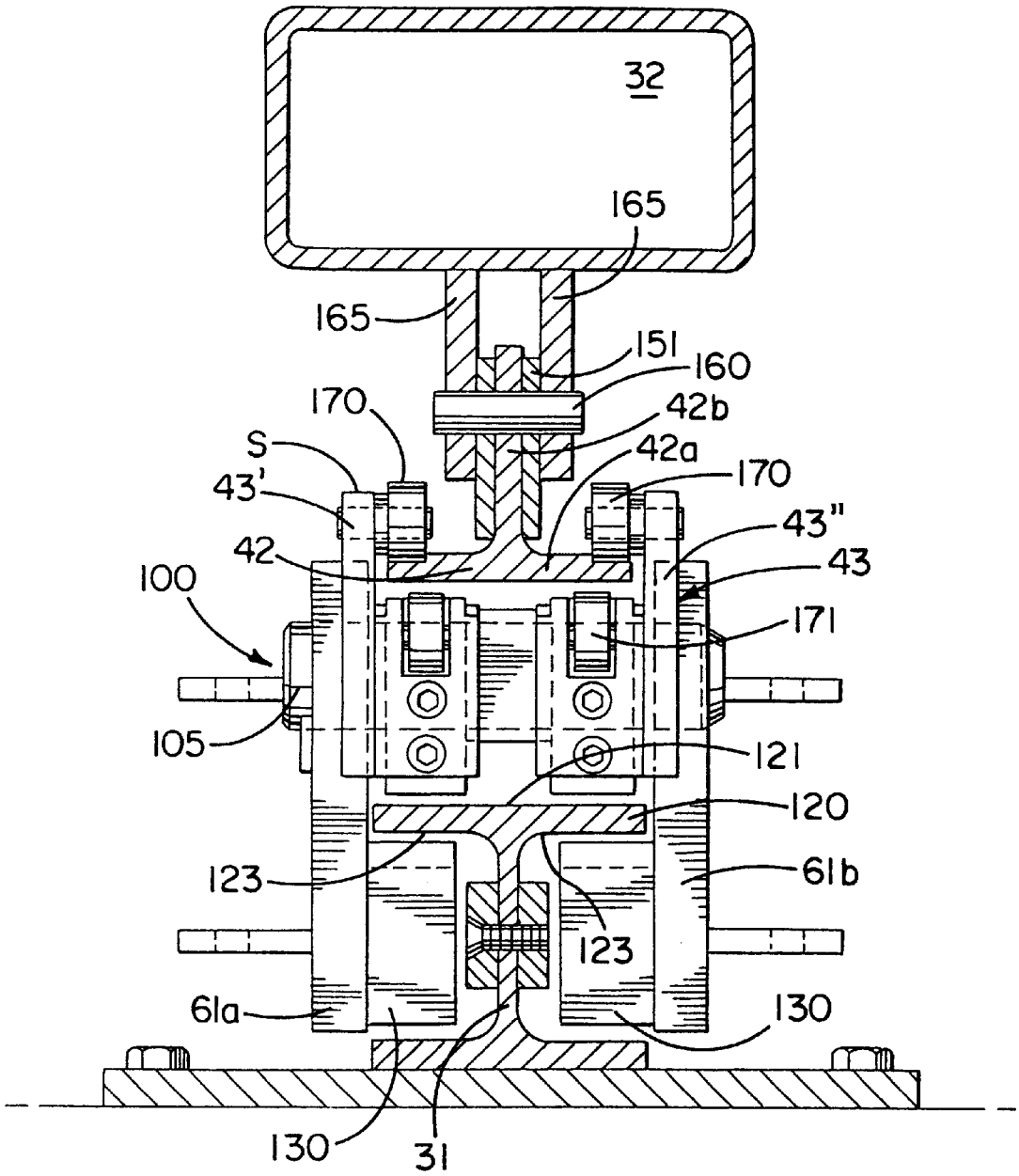
FIG. 16 is a sectional view of the latching assembly according to an embodiment of the invention.
Figure 17:
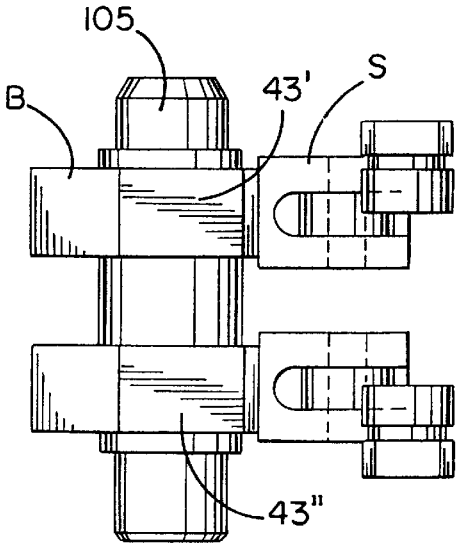
FIGS. 17–19 are top, side, and front views of a latch member according to an embodiment of the invention.

The movement of the latch member 43 between the non-engaging and engaging positions is controlled by movement of the latching bar 42 between its unlatched and latching positions. As seen most clearly in FIG. 16, the latching bar according to the present embodiment is in the form of a T-bar 42. The T-bar 42 is operatively connected to the supporting member 32 for movement between its unlatched position (FIG. 13), and its latching position (FIG. 14). According to the present embodiment, the vertical flange 42b of the T-bar 42 includes angled slots spaced there along. One such angled slot 150 is shown in FIG. 13. Optionally, the T-bar 42 may include reinforcing plates 151 in the area of the slots 150. The supporting member 32 includes horizontally disposed pins, such as 160 in FIG. 13, which are received within the angled slots 150. As seen in FIG. 16, the pins 160 in the present embodiment are fixed to the supporting member 32 by attachment to depending flanges 165 fixed to the member 32. Because of the engagement of the pins 160 with the slots 150, linear movement of the latching bar 42 in a direction parallel to the support structure 30 is translated into a vertical movement of the latching bar 42. In reference to FIG. 13, as the latching bar 42 moves to the left, the pin 160 engages the sidewall of the slot 150 such that the sidewalls urge the latching bar 42 upwardly. It will be appreciated that the latching bar 42 need not depend from supporting member 32. Rather, it could be disposed beside supporting member 32, or in a variety of other positions or orientations.

The linear movement of the latching bar 42, according to the present embodiment, is provided by the actuator 44, shown in FIG. 2 and which is operatively connected to the dock end of the latching bar 42 and to the dock end of support structure 30. In the present embodiment, the actuator 44 is a linear actuator including a piston 44a which is pivotally attached to the dock end of the latching bar 42 at pivot point 42a. A pivotal connection of the linear actuator 44, the latching bar 42 and the support structure is required to prevent the complex horizontal and vertical movement of the latching bar between the unlatched and latching positions from placing undue stresses on the actuator 44. Actuator 44 can be pneumatic, hydraulic, or another commonly known type of linear motion device.

The movement of the latching bar 42 between the unlatched and latching positions causes the latch member 43 to move between its non-engaging and engaging positions. As seen in FIG. 16 , the latch member 43 includes upper rollers 170 which engage an upper surface of the horizontal flange 42a of the T-bar 42. Thus, as the latching bar or T-bar 42 moves upwardly, the rollers 170 move upwardly as well. As best seen in FIG. 14, this upward movement of the rollers 170 cause the latch member 43 to rotate (counterclockwise in the sense of FIGS. 13–15) about the pivot axis 100 into the engaging position. Conversely, lowering of the T-bar 42 from the latching position of FIG. 14 to the unlatched position of FIG. 13 allows the latch member to rotate (clockwise) about the pivot axis 100 back to the non-engaging position of FIG. 13. The latch member may either rotate back to the non-engaging position by gravity, or be pushed there by contact of the T-bar 42 with a roller 171 (FIG. 16).

Once the locking arm of the present invention is in a chocking position, and once the vehicle V has backed to its loading/unloading position adjacent the dock D, an operator actuates the latching mechanism 40. To summarize, such actuation of the latching mechanism 40 causes the actuator 44 to move the latching bar 42 to the left in the sense of FIG. 13. This in turn causes the latching bar 42 to move upwardly because of the engagement of the pins 160 in the angled slots 150. The upward movement of the latching bar 42 is translated to the latch member, such that the latch member 43 rotates to the engaging position, wherein the engaging portion 110 engages a top surface 121 of the flange 120. As the engaging portion 110 engages the surface 120, the engaging block 130 is pulled upward into engagement with the bottom surface 123 of the flange 120, thus clamping the trolley assembly 60 and attached locking arm 70 in place along the support structure. This clamping action provides a clamping or restraining force that prevents the vehicle V from moving away from the loading dock when the latching mechanism 40 is actuated.

The latching mechanism 40 just described also includes an advantageous feature, which forms a significant aspect of the invention, wherein the restraining force of the latching mechanism increases as the pulling force exerted on the assembly by a vehicle V attempting to drive away from the dock (with the latching mechanism activated) increases. Referring to FIG. 14, it will be appreciated that an attempt by the vehicle to pull away from the dock will result in a leftward pullout force being exerted on the trolley assembly 60 at the connection point 71 with the locking arm 70 (see FIG. 2). Because of the orientation of the textured surface relative to pivot axis 100, the leftward force will in turn cause the textured surface of the engaging portion 110 to bite harder into the flange 120. As a result, the clamping force increases, and the latch member is further rotated about the pivot point 100 to the position shown in FIG. 15. As the leftward force on the trolley assembly 60 increases, so does the clamping force exerted by the latch member 43 and the engaging block 130.

According to a further significant aspect of the invention, any increased restraining force provided by the latching mechanism 40, for increasing pullout force by the vehicle V, is not borne by the actuator 44. When the increased pullout force causes the latch member to rotate to the FIG. 15 position, as described above, the upper rollers 170 of the latch member 43 start to separate from engagement with the flange 42a of the T-bar 42. Thus, the increased pullout force actually decouples the actuator 44 from the latch member 43. As a result, a less powerful, thus less expensive actuator may be chosen when designing the system since the actuator only needs to exert the force necessary to move the latching bar 42 to the latching position, thus moving the latch member 43 and engaging block 130 to the clamping position. Once the latching bar is moved to the latching position, the actuator may be locked in place and de-activated, since any pullout force exerted by the vehicle V will increase the clamping force, and not require the actuator to bear any additional load.

It will be appreciated by one of skill in the art that various modifications may be made to the operator actuated latching mechanism 40 without departing from the scope of the invention. For example, and as referred to above, the latch member may either be unitary or in two similarly-operating halves 43' and 43" (FIG. 16). As presently preferred, the latch member is in the two halves 43' and 43". Use of such a latch member is advantageous since the vehicle V could exert forces on the latching mechanism which would be in a direction either to the left or to the right in the sense of FIG. 16. Such "side loading" of the lock assembly could cause uneven application of the clamping force on the flange 120 if a unitary latch member were used. Use of the two-part latch member allows each to act independently. Accordingly, in a side load situation, it would be possible for one latch member, such as 43' to successfully clamp the flange 120, while the other latch member 43" would not clamp the flange to the same degree. This may be preferable to having the side load cause an uneven clamping by a unitary latch member. In addition, the connection between the latch member or members 43 need not be limited to a pivotal connection. Rather, other types of connections could be used, so long as they provided for movement of the latch member between a non-engaging and engaging position upon movement of the latching bar between its unlatched and latching positions. Similarly, the connection between the latching bar and the latch member is not limited to the roller engagement with a T-bar flange as has been disclosed herein. In addition, while the textured surface of the engaging portion of the latch member and the engaging blocks is preferably a toothed surface, other high-friction textures could also be used. Further modifications within the scope of the invention will also occur to those of skill in the art.

According to a further aspect of the invention, the vehicle restraint may include signalling components to enhance the safety of vehicle loading and unloading. As one example of such safety enhancements, the restraint according to the invention may be provided with a switch that is responsive to movement of the latching bar 42 to the latching position for illuminating a visual signal. For this purpose, a switch 180 is shown mounted to the inside face of one of the flanges 165 mounted to the supporting member 32. The switch 180 is disposed at a position such that it will sense movement of the latching bar to the latching position. In the present embodiment, this is achieved by the switch 180 being disposed adjacent the distal end of the latching bar 42 when the latching bar is in the unlatched position of FIG. 13. As the latching bar 42 moves to the latching position, the latching bar 42 interacts with the switch 180, causing it to emit a signal that the latching bar 42 is in the latching position. The switch 180 may be any of a variety of sensors, including (by way of example) electro-mechanical, magnetic and electro-optic sensors. Accordingly, the "interaction" of the latching bar 42 with the switch 180 may be a mechanical interaction, or it may simply be the bar 42 passing in front of an electric eye or the like. In any event the latching bar 42 is shown interacting with the switch 180 in the position of FIG. 14. The switch 180 is further connected to electronics (not shown) which illuminate a visual signal, such as a green light G (shown interior the loading dock in FIG. 1) upon movement of the latching bar 42 to the latching position. Since the activation of switch 180 serves as an indication that a vehicle is safely restrained at the loading dock D, the green light G internal to the loading dock serves as an indication to the dock personnel that the vehicle V may be safely unloaded without risk that the vehicle V will move away from the loading dock. In addition, the switch 180 may also serve to illuminate a red signal R (seen in FIG. 20) on the dock face. This red light R serves as an indication to the vehicle operator that the vehicle is restrained in a loading/unloading position, and thus that it should not be attempted to move the vehicle away from the dock.

According to a further aspect of the invention, an additional switch 190 may also be provided to ensure that the locking arm is in a chocking position. The switch 190, which according to this embodiment is an electro-mechanical sensor is disposed on the trolley assembly 60, and is engaged by one of the sideplates of the locking arm 70 when the locking arm is in the stored position of FIG. 2. Like switch 180, switch 190 may be any of a variety of sensors. Movement of the locking arm 70 to the chocking position of FIG. 4, however, causes the arm to come out of contact with the switch 190. This loss of contact generates a signal indicating that the locking arm is in the chocking position. This signal may be supplied to electronics, not shown, which would only illuminate the green signal G and the red signal R if both the switches 180 and 190 indicated that the latching bar and locking arm 70 were in their latching and chocking positions, respectively. The additional switch thus prevents the lights from illuminating in the condition where a vehicle is not present in the restraint, but the operator actuated latch mechanism 40 is nonetheless actuated. Further, and as will be appreciated by those of skill in the art, other switches besides those described herein could be used. Further, the location and specific operation of the switches could be different. For the purpose of practicing the invention, it is only required that the switch 180 generates a signal in response to the movement of the latching bar 42 to the latching position. Such a switch, for example, could even sense the position of the piston of the actuator 44 and still fall within the scope of the invention. Similarly, it is only required that the second switch 190 generate a signal in response to the movement of the locking arm to the chocking position from the stored position.

Figure 20:
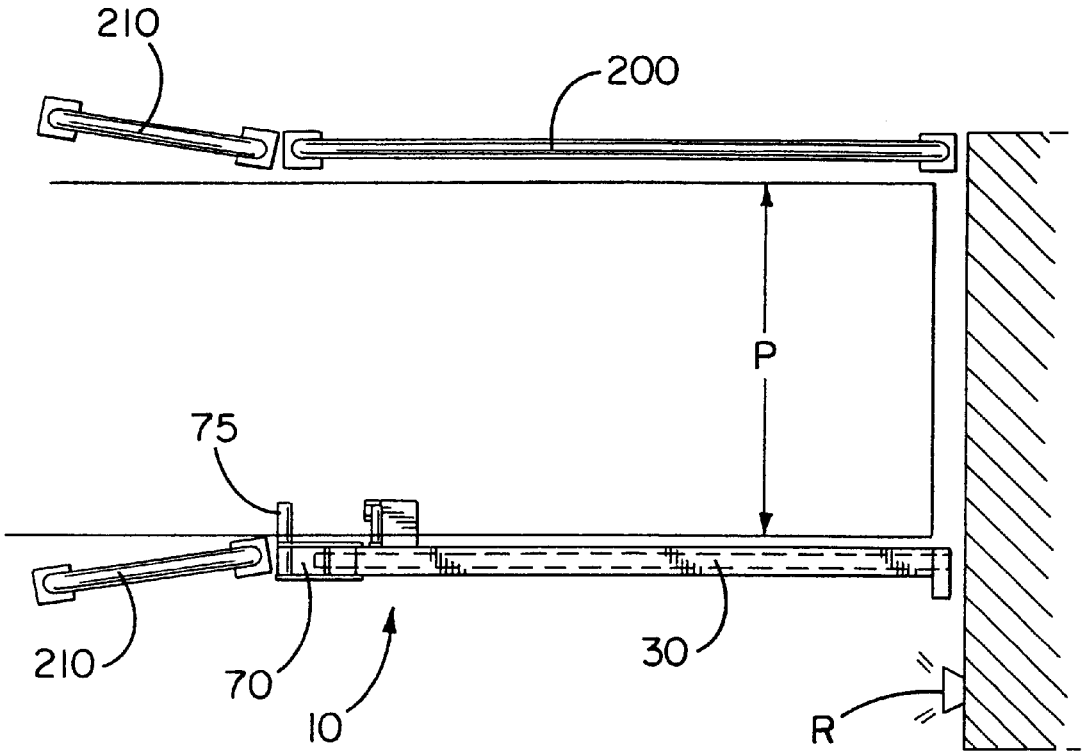
FIG. 20 is a plan view of the loading dock area including at least one vehicle restraint.

While the invention has been described as including a single vehicle restraint, two restraints could also be used. FIG. 20 shows a plan view of a loading dock area including a restraint system according to the invention. A restraint 10 is disposed adjacent to and beside a vehicle pathway P over which the vehicle V may pass as it proceeds to the dock. Since the restraint system 10 according to the embodiment described herein is disposed above-ground, it must also be disposed outside of the vehicle path P to avoid interfering with the backing of the vehicle to the dock. At the same time, the restraint 10 must be in close enough proximity to the path P to ensure that the roller 75 of the locking arm 70 can engage the leading tire T for restraining the vehicle. To ensure this proper positioning of the vehicle V relative to the restraint 10, guide member 200 may be disposed on the opposite side of the vehicle path P from the restraint 10. Indeed, the support member 30 and the guide member 200 effectively define the width of the path P. In addition to guiding vehicle V as it backs toward the dock D, guide member 200 may also help to restrain side to side motion of vehicle V when it is latched into position adjacent the loading dock D. In the case where the tire T engaged by restraint 10 is a driven wheel, attempted pullout could cause the rear of the vehicle V to translate in a side direction along the dock face. Retention of the vehicle V by guide member 200 prevents such translation. Additionally, forward guide members 210 may also be included on one or both sides of the path P to further assist in guiding the backing vehicle into proper position with respect to the restraint 10. Guide members 200 and 210 may simply be structural members (e.g. round or rectangular tubular steel; poured concrete; reinforced concrete; pre-fabricated concrete barriers, etc.) disposed above the roadway surface on support structures or otherwise. Further, the guide member 200 may be replaced with a mirror image of restraint 10 such that both leading tires of the vehicle V (one on each side) would be restrained according to the present invention. In lieu of the stationary guiding members disclosed herein, other mechanical, electrical or electronic sensing devices may be used to assure predetermined engagement between roller 75 and the leading tire T of vehicle V prior to permitting actuation of the latching mechanism.

There has thus been described a new wheel-activated vehicle restraint for securing a vehicle in a loading/unloading position adjacent a loading dock. A support structure is disposed so as to be beside the vehicle as it approaches the dock. A lock assembly is operatively mounted on the support structure for movement between a stored position and a chocking position, wherein a leading tire of the vehicle is disposed between a trigger assembly and a locking arm. The trigger, locking arm and intermediate trolley assembly are operatively connected and designed to operate such that the locking arm moves from its stored position to a chocking position in response to engagement between the tire and the trigger, and such that the locking arm engages a bottom portion of the tire and moves along the peripheral surface of the wheel to the chocking position. The invention also includes an operator actuated latch mechanism which secures the lock assembly in place along the support structure to thereby restrain the chocked vehicle in place relative to the loading dock. A latching bar is actuated by an actuator and moves a latch assembly into an engaging position. In the engaging position, the trolley assembly is clamped to a portion of the support structure to prevent movement of the vehicle. A pullout force exerted by the vehicle causes the clamping force to increase, and decouples the latch member from the latching bar. The invention also includes a variety of safety features. Further, the invention may be practiced otherwise than as specifically disclosed herein. The invention is intended to cover any such modifications and equivalents as may fall within the scope of the appended claims.

What is claimed is:

1. A wheel-activated vehicle restraint device for restraining at least one wheel of a vehicle during loading and unloading of the vehicle at a position adjacent a dock face, the wheel rolling along a roadway surface adjacent the dock face, the restraint comprising:

a support structure extending from a first end thereof adjacent the dock to a distal end thereof, the support structure comprising a guide member disposed along the roadway surface, the support structure also including an elevated supporting member;

a trigger assembly operatively connected to the guide member for initially engaging the wheel of the vehicle as the wheel rolls toward the dock position;

a locking arm which operatively engages the supporting member for moving to a chocking position on the wheel in response to engagement between the wheel and the trigger assembly;

a trolley assembly operatively connecting the trigger assembly and the locking arm at a connection point such that the trigger assembly is selectively positionable relative to the connection point in response to the dimensions of the wheel for insuring that the locking arm engages a bottom portion of the wheel and moves along the peripheral surface of the wheel to a chocking position whereby the vehicle can be restrained at the dock position.

2. The wheel-activated vehicle restraint device of claim 1, and including an operator controlled latching mechanism, the latching mechanism comprising:

a latching bar operatively connected to the supporting member for movement between an unlatched and a latching position;

an actuator coupled to the latching bar for moving the latching bar between the unlatched and latching positions;

a latch member, the latch being operatively connected to the trolley assembly for movement relative thereto, and including at least one engaging portion, the latch member being moveable relative to the trolley assembly between an engaging position, wherein the engaging portion engages a first surface of the guide member, and a non-engaging position, wherein the engaging portion is spaced from the first surface, the latch member being operatively connected to the latching bar for the movement between the non-engaging position and the engaging position in response to movement of the latching bar between the unlatched and latching positions.

3. The wheel-activated vehicle restraint device of claim 2, wherein the latch member is pivotally connected to the trolley assembly for pivotal rotation between the engaging position and the non-engaging position.

4. The wheel-activated vehicle restraint device of claim 3, wherein the guide member includes an upper flange parallel to the roadway surface and a vertical web, an upper surface of the upper flange forming the first surface of the guide member, and wherein the trolley assembly comprises at least one engaging block operatively connected thereto, the at least one engaging block being disposed on the trolley assembly such that the engaging block is adjacent to a lower surface of the upper flange of the guide member as the trolley assembly moves along the guide member.

5. The wheel-activated vehicle restraint device of claim 4, wherein: 1) the pivotal connection between the latch member and the trolley assembly; and 2) the at least one engaging block are disposed on the trolley assembly such that engagement of the at least one engaging portion with the upper surface of the upper flange causes the at least one engaging block to engage the lower surface of the upper flange, thereby generating a clamping force and clamping the flange between the engaging portion and the engaging block and latching the trolley assembly and the locking arm in position relative to the support structure.

6. The wheel-activated vehicle restraint device of claim 5, wherein the engaging portion is disposed relative to the pivotal connection such that the latch member will rotate about the pivot point to increase the clamping force in response to a pullout force exerted on the locking arm.

7. The wheel activated vehicle restraint device of claim 4, wherein the trolley assembly includes first and second engaging blocks disposed on opposite sides of the web of the guide member.

8. The wheel-activated vehicle restraint device of claim 3, wherein the latching bar moves generally upwardly between the unlatched and latching positions, and wherein the latching bar includes a flange extending parallel to the support structure, and wherein the latch member includes at least one roller engaging an upper surface of the latching bar flange, such that movement of the latching bar from the unlatched to latching positions causes the latch member to pivot to the engaging position.

9. The wheel-activated vehicle restraint device of claim 8, wherein the engaging portion is disposed relative to the pivotal connection such that the latch member will rotate about the pivot point such that the at least one roller becomes disengaged from the upper surface of the latching bar flange, thus decoupling the latch member from the actuator, in response to a pullout force exerted on the locking arm.

10. The wheel-activated vehicle restraint device of claim 2, wherein the at least one engaging portion of the latch member includes a textured surface for engaging the first surface of the guide member.

11. The wheel-activated vehicle restraint device of claim 10, wherein the textured surface is a toothed surface.

12. The wheel-activated vehicle restraint device of claim 2, wherein the latch member includes first and second members, each member including an engaging portion.

13. The wheel-activated vehicle restraint device of claim 2, wherein the latching bar comprises a vertical web having angled slots spaced therealong, the slots including sidewalls, and wherein the support member includes horizontally disposed pins attached thereto, the pins being received in the angled slots, such that movement of the latching bar outwardly from the dock face causes the sidewalls of the slots to engage the pins, thereby raising the latching bar from the unlatched to the latching position.

14. The wheel-activated vehicle restraint device of claim 2, wherein the actuator is a linear actuator operatively connected to the latching bar for moving the latching bar linearly outwardly and inwardly relative to the dock face, such that the latching bar moves between the unlatched and latching positions.

15. The wheel-activated vehicle restraint device of claim 2, and including a switch for sensing movement of the latching bar between the unlatched and latching positions, the switch generating a first signal when the latching bar is in the latching position.

16. The wheel-activated vehicle restraint device of claim 15, and including at least one visual indicator for illuminating in response to the first signal.

17. The wheel-activated vehicle restraint device of claim 15, and including a second switch for sensing movement of the locking arm between a stored and the chocking position, the second switch generating a second signal when the locking arm is in the chocking position.

18. The wheel-activated vehicle restraint device of claim 17, and including at least one visual indicator for illuminating in response to the first and the second signal.

19. The wheel-activated vehicle restraint device of claim 1, wherein the trigger assembly includes a guide portion of movement along the guide member, and a wheel-engaging portion for movement along the roadway, the wheel-engaging portion being vertically displaceable relative to the guide portion.

20. The wheel-activated vehicle restraint device of claim 19, wherein the wheel-engaging portion of the trigger assembly is pivotally connected to the guide portion.

21. The wheel-activated vehicle restraint device of claim 1, wherein the support structure is disposed beside a vehicle path, and wherein the locking arm includes a second roller extending away from the support structure and into the vehicle path to engage the wheel.

22. The wheel-activated vehicle restraint device of claim 21, and including a guide member disposed on the opposite side of the vehicle path from the support structure, the separation of the guide member and the support structure defining the vehicle path, the guide member and the support structure guiding the vehicle in the vehicle path.

23. The wheel-activated vehicle restraint device of claim 22, wherein forward guide members are disposed distally of the guide member and the support structure, the separation between the forward guide members increasing as their distance from the dock face increases to guide the vehicle in the guide path.

24. The wheel-activated vehicle restraint device of claim 21, wherein the vehicle restraint device is a first vehicle restraint device and including a second mirror-imaged vehicle restraint device disposed on the opposite side of the vehicle path from the support structure of the first vehicle restraint device.

25. The wheel-activated vehicle restraint device of claim 1, and including a limiting assembly for limiting separation of the trigger assembly and the trolley assembly.

26. The wheel-activated vehicle restraint device of claim 25, wherein the limiting assembly comprises a stop bar operatively connected between the trigger assembly and the trolley assembly.

27. The wheel-activated chocking device for restraining at least one wheel of a vehicle at a loading dock, the device comprising:

a support structure extending from a first end thereof adjacent the dock to a distal end thereof, the support structure comprising a guide member disposed along a roadway adjacent the loading dock, the support structure also including an elevated support member;

a trigger mechanism for engaging a leading wheel of the vehicle as the vehicle moves toward the dock;

a resiliently biased locking arm for moving to a chocking position on the leading wheel, the locking arm being activated in response to engagement between the leading wheel and the trigger mechanism; and a trolley assembly operatively connecting the trigger mechanism and the locking arm and controlling the movement of the locking arm in response to the dimensions and movement of the wheel, wherein the locking arm engages a bottom edge of the wheel and moves along the peripheral surface of the wheel to a chocking position.

28. The chocking device of claim 27, wherein the trolley assembly comprises a connection point for operatively connecting the trigger mechanism and the locking arm, and wherein a variable length biasing link controls the position of the connection point relative to the trigger mechanism in response to the dimensions and movements of the wheel.

29. The chocking device of claim 28, wherein the chocking device is a first chocking device, and including a second, mirror image chocking device disposed on the opposite side of the vehicle path from the support structure of the first chocking device.

30. The chocking device of claim 27, wherein the support structure is disposed beside a vehicle path, and wherein the locking arm includes a portion extending away from the support structure and into the vehicle path to engage the wheel.

31. The chocking device of claim 30, wherein a guide member is disposed on the opposite side of the vehicle path from the support structure, the guide member and the support structure guiding the vehicle in the vehicle path.

32. A wheel-activated chocking device for restraining at least one wheel of a vehicle at a loading dock, the device comprising:

a trigger mechanism for engaging a leading wheel of the vehicle as the vehicle moves toward the dock;

a resiliently biased locking arm for moving to a chocking position on the leading wheel, the locking arm being activated in response to engagement between the leading wheel and the trigger mechanism;

a trolley assembly operatively connecting the trigger mechanism and the locking arm and controlling the movement of the locking arm in response to the dimensions and movement of the wheel, wherein the locking arm engages a bottom edge of the wheel and moves along the peripheral surface of the wheel to a chocking position; and an operator controlled latching assembly for securing the vehicle in place at the dock, and including a latch member operatively connected to the trolley assembly and moveable between an engaging position, wherein the latch member engages a stationary member, and a non-engaging position wherein the latch member is spaced from the stationary member to allow the trolley assembly to move relative thereto.

33. The chocking device of claim 32, wherein the latch member is operatively connected to a latching bar, the latching bar being moveable between an unlatched and a latching position to move the latch member between the non-engaging and engaging positions.

34. The chocking device of claim 33, and including a switch for sensing movement of the latching bar between the unlatched and latching positions, the switch generating a first signal when the latching bar is in the latching position.

35. The chocking device of claim 32, and including at least one engaging block on the trolley assembly, the 1) operative connection of the latch member to the trolley assembly and; 2) engaging block being disposed on the trolley assembly such that movement of the latch member to the engaging position causes the engaging block to engage the stationary member at a position opposed to that of the latch member, thereby generating a clamping force and clamping the stationary member between the latch member and the engaging block, thereby latching the trolley assembly relative to the stationary member.

36. The chocking device of claim 35, wherein the latch member is disposed relative to the operative connection with the trolley assembly such that the latch member moves to increase the clamping force in response to a pullout force exerted on the locking arm.

37. The chocking device of claim 36, wherein an actuator is coupled to the latch member for moving the latch member between the non-engaging and engaging positions, and wherein movement of the latch member to increase the clamping force in response to a pullout force decouples the actuator and the latch member.

38. A wheel-activated chocking device for restraining at least one wheel of a vehicle at a loading dock, the device comprising:

a support structure extending from a first end thereof adjacent the dock to a distal end thereof;

a trigger mechanism for engaging a leading wheel of the vehicle as the vehicle moves toward the dock;

a resiliently biased locking arm for moving to a chocking position on the leading wheel, the locking arm being activated in response to engagement between the leading wheel and the trigger mechanism; and a trolley assembly operatively connecting the trigger mechanism and the locking arm and controlling the movement of the locking arm in response to the dimensions and movement of the wheel, wherein the locking arm engages a bottom edge of the wheel and moves along the peripheral surface of the wheel to a chocking position, the trigger mechanism operatively engaging the support structure for movement therealong, the trigger mechanism including a guide portion and a wheel-engaging portion for movement along the support structure, the wheel-engaging portion being vertically displaceable relative to the guide portion.

39. The chocking device of claim 38, wherein the wheel-engaging portion is pivotally connected to the guide portion.

*40. A wheel-actuated chocking device for restraining at least one wheel of a vehicle on a roadway vehicle path at a loading dock, the device comprising:*

*a support structure on said roadway and extending from a first end thereof adjacent the dock to a distal end thereof, the support structure comprising a guide member disposed along the roadway adjacent the loading dock, the support structure also including an elevated support surface;*

*a trigger mechanism for engaging a leading wheel of the vehicle as the vehicle moves toward the dock;*

*a resiliently biased locking arm for moving along said support surface from a storage position to a chocking position on the leading wheel, the locking arm being activated in response to engagement between the leading wheel and the trigger mechanism; and*

*a trolley assembly operatively connecting the trigger mechanism and the locking arm and controlling the movement of the locking arm in response to the dimensions and movement of the wheel, wherein the locking arm engages a bottom edge of the wheel and moves along the peripheral surface of the wheel to a chocking position.*

*41. The chocking device of claim 40, wherein the chocking device is a first chocking device, and including a second, mirror image chocking device disposed on the opposite side of the vehicle path from the support structure of the first chocking device.*

*42. The chocking device of claim 41 wherein a forward guide member is disposed distally of each guide member and support structure, the separation between the forward guide members increasing as their distance from the dock face increases to guide the vehicle in the vehicle path.*

*43. The chocking device of claim 40, wherein the support structure is disposed beside the vehicle path, and wherein the locking arm includes a portion extending away from the support structure and into the vehicle path to engage the wheel.*

*44. The chocking device of claim 40 having an operator-controlled latching assembly for securing the vehicle in place at the dock, said latching assembly including: a latching bar operatively connected to the support structure for movement between an unlatched position and a latched position; and an actuator coupled to said latching bar for moving the latching bar between the unlatched and latched positions, said latching assembly adapted to operatively connect said locking arm to said support structure to prevent said locking arm from moving longitudinally along said support structure.*

*45. The chocking device of claim 44, wherein the latching bar comprises a vertical web having angled slots spaced therealong, the slots including sidewalls, and wherein the support structure includes horizontally disposed pins attached thereto, the pins being received in the angled slots, such that movement of the latching bar outwardly from the dock face causes the sidewalls of the slots to engage the pins, thereby raising the latching bar from the unlatched to the latching position.*

*46. The chocking device of claim 45, wherein the actuator is a linear actuator operatively connected to the latching bar for moving the latching bar linearly outwardly and inwardly relative to the dock face, such that the latching bar moves between the unlatched and latching positions.*

*47. The chocking device of claim 44, and including a switch for sensing movement of the latching bar between the unlatched and latching positions, the switch generating a first signal when the latching bar is in the latching position.*

*48. The chocking device of claim 47, and having at least one visual indicator for illuminating in response to the first signal.*

*49. The chocking device of claim 47, and having a second switch for sensing movement of the locking arm between a stored and chocking position, the second switch generating a second signal when the locking arm is in the chocking position.*

*50. The chocking device of claim 49, and having at least one visual indicator for illuminating in response to the first and second signal.*

*51. The chocking device of claim 44, wherein the latching bar comprises a vertical latch web and wherein the support structure includes a vertical support web, one of said webs having angled slots spaced therealong, the slots including sidewalls, and the other of said webs having horizontally disposed pins attached thereto, the pins being received in the angled slots, such that longitudinal movement of the latching bar relative to the support web causes the sidewalls of the slots to engage the pins, thereby raising the latching bar from the unlatched to the latching position.*

*52. The chocking device of claim 44 which includes a sloped support extending between said elevated support surface and said roadway to form a ramp.*

*53. The chocking device of claim 52 wherein said storage position is adjacent the roadway at the distal end of said support structure and spaced from said trigger mechanism whereby said wheel engages said locking arm adjacent the roadway prior to engaging said trigger mechanism.*

*54. A wheel-actuated chocking device for restraining at least one wheel of a vehicle at a loading dock, the device comprising:*

*a support structure extending from a first end thereof adjacent the dock to a distal end thereof, the support structure comprising a guide member disposed along the roadway adjacent the loading dock, said support structure including a support surface;*

*a trigger mechanism for engaging a leading wheel of the vehicle as the vehicle moves toward the dock;*

*a resiliently biased locking arm adapted to move to a chocking position on the leading wheel, the locking arm being activated in response to engagement between the leading wheel and the trigger mechanism; and*

*a trolley assembly between the trigger mechanism and the locking arm and controlling the movement of the locking arm in response to the dimensions and movement of the wheel, wherein the locking arm engages a bottom edge of the wheel and moves along the peripheral surface of the wheel to a chocking position.*

*55. The chocking device of claim 54 wherein said support surface is elevated above said roadway and said device includes a sloped support extending between said elevated portion and said roadway to provide a ramp.*

*56. A wheel-actuated chocking device for restraining at least one wheel of a vehicle on a roadway vehicle path at a loading dock, the device comprising:*

*a support structure extending from a first end thereof adjacent the dock to a distal end thereof, the support structure being disposed on the roadway adjacent the dock;*

*a trigger mechanism for engaging a leading wheel of the vehicle as the vehicle moves toward the dock;*

*a resiliently-biased locking arm including a roller projecting away from the support structure into the vehicle path, the locking arm being movable between a stored position in which the roller is disposed on the roadway and a raised chocking position in which the roller is in contact with the leading wheel; and*

*a trolley assembly operatively connecting the trigger mechanism and the locking arm and controlling the movement of the locking arm in response to the dimensions and movement of the wheel, wherein the locking arm engages a bottom edge of the wheel and moves along the peripheral surface of the wheel to a chocking position.*

*57. The chocking device of claim 56 which further includes a ramp portion, and wherein a portion of the locking arm engages the ramp portion to move the tubular member between the stored position and the raised, chocking position.*

*58. The chocking device of claim 57 wherein the locking arm includes a first roller and wherein the tubular member is a second roller, the first roller engaging the ramp portion to move the second roller from the stored position to the raised chocking position.*

*59. The chocking device of claim 58 wherein the motion of the wheel departing from the loading dock causes the first roller to be moved down the ramp portion to reposition the second roller in the stored position.*

*60. The chocking device of claim 57 wherein the chocking device is a first chocking device and includes a second, mirror image chocking device disposed on the opposite side of the vehicle path.*

*61. A wheel-actuated chocking device for restraining at least one wheel of a vehicle on a roadway vehicle path at a loading dock, the device comprising:*

*a support structure on said roadway and extending from a first end thereof adjacent the dock to a distal end thereof, the support structure comprising a guide member disposed along the roadway adjacent the loading dock, the support structure also including an elevated support surface;*

*a ramp having a ramp surface disposed between the distal end of said support surface and the roadway;*

*a trigger mechanism for engaging a leading wheel of the vehicle as the vehicle moves toward the dock;*

*a resiliently biased locking arm for moving along said ramp surface and said support surface from a storage position at the distal end of said ramp surface to a chocking position on said support surface behind the leading wheel, the locking arm being activated in response to engagement between the leading wheel and the trigger mechanism, said locking arm including a roller projecting away from the support structure into the vehicle path;*

*a trolley assembly operatively connecting the trigger mechanism and the locking arm and controlling the movement of the locking arm in response to the dimensions and movement of the wheel, wherein said storage position is spaced from said trigger mechanism such that said wheel engages said locking arm adjacent said roadway prior to engaging said trigger mechanism and the locking arm moves along the peripheral surface of the wheel and the elevated support surface to a chocking position;*

*an operator-controlled latching assembly for securing the vehicle in place at the dock, said latch assembly including: a latching bar operatively connected to the support structure for movement between an unlatched position and a latched position;*

*the latching bar including a vertical latch web and the support structure including a vertical support web, one of said webs having angled slots spaced therealong, the slots including sidewalls, and the other of said webs having horizontally disposed pins attached thereto, the pins being received in the angled slots such that longitudinal relative movement of the latching bar and the support web causes the sidewalls of the slots to engage the pins, thereby raising the latching bar from the unlatched to the latching position;*

*and an actuator coupled to said latching bar for moving the latching bar between the unlatched and latched positions, said latching assembly adapted to operatively connect said locking arm to said support structure to prevent said locking arm from moving longitudinally along said support structure.*

*62. A wheel-actuated chocking device for restraining at least one wheel of a vehicle on a roadway path at a loading dock, the device comprising:*

*a support structure on said roadway and extending from a first end thereof adjacent the dock to a distal end thereof, the support structure comprising a guide member disposed along the roadway adjacent the loading dock, the support structure also including an elevated support surface;*

*a trigger mechanism for engaging a leading wheel of the vehicle as the vehicle moves toward the dock;*

*a resiliently biased locking arm for moving along said support surface to a chocking position on the leading wheel, the locking arm being activated in response to engagement between the leading wheel and the trigger mechanism; and*

*a variable length biasing link controlling the movement of the locking arm in response to the dimensions and movement of the wheel, wherein the locking arm resiliently engages a bottom edge of the wheel and moves along the peripheral surface of the wheel to a chocking position.*

*63. A wheel-actuated chocking device for restraining at least one wheel of a vehicle at a loading dock, the device comprising:*

*a support structure extending from a first end thereof adjacent the dock to a distal end thereof, the support structure comprising a guide member disposed along a roadway adjacent the loading dock, said support structure including a support surface;*

*a trigger mechanism for engaging a leading wheel of the vehicle as the vehicle moves toward the dock;*

*a resiliently biased locking arm adapted to move to a chocking position on the leading wheel, the locking arm being activated in response to engagement between the leading wheel and the trigger mechanism; and*

*a variable length biasing link between the trigger mechanism and the locking arm and controlling the movement of the locking arm in response to the dimensions and movement of the wheel, wherein the locking arm resiliently engages a bottom edge of the wheel and moves along the peripheral surface of the wheel to a chocking position.*

*64. A wheel-actuated chocking device for restraining at least one wheel of a vehicle on a roadway path at a loading dock, the device comprising:*

*a support structure extending from a first end thereof adjacent the dock to a distal end thereof, the support structure being disposed on the roadway adjacent the dock;*

*a trigger mechanism for engaging a leading wheel of the vehicle as the vehicle moves toward the dock;*

*a resiliently-biased locking arm including a roller projecting away from the support surface into the path of the wheel, the locking arm being movable between a stored position in which the roller is disposed on the roadway and a raised chocking position in which the roller is in contact with the leading wheel; and*

*a variable length biasing link operatively connecting the trigger mechanism and the locking arm and controlling the movement of the locking arm in response to the dimensions and movement of the wheel, wherein the locking arm resiliently engages a bottom edge of the wheel and moves along the peripheral surface of the wheel to a chocking position.*

*65. A wheel-actuated chocking device for restraining at least one wheel of a vehicle on a roadway path at a loading dock, the device comprising:*

*a support structure on said roadway and extending from a first end thereof adjacent the dock to a distal end thereof, the support structure comprising a guide member disposed along the roadway adjacent the loading dock, the support structure also including an elevated support surface;*

*a ramp having a ramp surface disposed between the distal end of said support surface and the roadway;*

*a trigger mechanism for engaging a leading wheel of the vehicle as the vehicle moves toward the dock;*

*a resiliently biased locking arm for moving along said ramp surface and said support surface from a storage position at the distal end of said ramp surface to a chocking position on said support surface behind the leading wheel, the locking arm being activated in response to engagement between the leading wheel and the trigger mechanism, said locking arm including a roller projecting away from the support structure into the path of the wheel;*

*a variable length biasing link operatively connecting the trigger mechanism and the locking arm and controlling the movement of the locking arm in response to the dimensions and movement of the wheel, wherein said storage position is spaced from said trigger mechanism such that said wheel engages said locking arm adjacent said roadway prior to engaging said trigger mechanism and the locking arm is resiliently biased to move along the peripheral surface of the wheel and the elevated support surface to a chocking position;*

*an operator-controlled latching assembly for securing the vehicle in place at the dock, said latching assembly including: a latching bar operatively connected to the support structure for movement between an unlatched position and a latched position;*

*the latching bar including a vertical latch web and the support structure including a vertical support web, one of said webs having angled slots spaced therealong, the slots including sidewalls, and the other of said webs having horizontally disposed pins attached thereto, the pins being received in the angled slots such that longitudinal relative movement of the latching bar and the support web causes the sidewalls of the slots to engage the pins, thereby raising the latching bar from the unlatched to the latching position;*

*and an actuator coupled to said latching bar for moving the latching bar between the unlatched and latched positions, said latching assembly adapted to operatively connect said locking arm to said support structure to prevent said locking arm from moving longitudinally along said support structure.*

*66. A wheel-actuated chocking device for restraining at least one wheel of a vehicle at a loading dock, the device comprising:*

*a trigger mechanism for engaging a leading wheel of the vehicle as the vehicle moves toward the dock;*

*a resiliently biased locking arm for moving to a chocking position on the leading wheel, the locking arm being activated in response to engagement between the leading wheel and the trigger mechanism;*

*a variable length biasing link operatively connecting the trigger mechanism and the locking arm and controlling the movement of the locking arm in response to the dimensions and movement of the wheel, wherein the locking arm resiliently engages a bottom edge of the wheel and moves along the peripheral surface of the wheel to a chocking position; and*

*an operator controlled latching assembly for securing the vehicle in place at the dock, and including a latch member operatively connected to the variable length biasing link and movable between an engaging position, wherein the latch member engages a stationary member, and a non-engaging position wherein the latch member is spaced from the stationary member to allow the variable length biasing link to move relative thereto.*

* * * * *